United States Patent
Clark et al.

(10) Patent No.: US 9,022,144 B2
(45) Date of Patent: May 5, 2015

(54) DRILL BIT ASSEMBLY HAVING ELECTRICALLY ISOLATED GAP JOINT FOR MEASUREMENT OF RESERVOIR PROPERTIES

(75) Inventors: Brian Clark, Sugar Land, TX (US); Reza Taherian, Sugar Land, TX (US); Derek W. Logan, Calgary (CA); Garry Holmen, Calgary, CA (US); Anthony R. Dopf, Bragg Creek (CA); Aaron Logan, Calgary (CA); Robert Utter, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 747 days.

(21) Appl. No.: 13/266,080

(22) PCT Filed: Oct. 29, 2009
(Under 37 CFR 1.47)

(86) PCT No.: PCT/CA2009/001569
§ 371 (c)(1),
(2), (4) Date: Jun. 4, 2012

(87) PCT Pub. No.: WO2010/121346
PCT Pub. Date: Oct. 28, 2010

(65) Prior Publication Data
US 2013/0043874 A1    Feb. 21, 2013

Related U.S. Application Data

(60) Provisional application No. 61/172,192, filed on Apr. 23, 2009.

(51) Int. Cl.
*E21B 47/12*  (2012.01)
*G01V 3/24*  (2006.01)
*E21B 10/00*  (2006.01)

(52) U.S. Cl.
CPC . *G01V 3/24* (2013.01); *E21B 10/00* (2013.01); *E21B 47/122* (2013.01)

(58) Field of Classification Search
USPC ............... 175/40, 50; 324/346, 355–356, 369
See application file for complete search history.

(56) References Cited

U.S. PATENT DOCUMENTS 4,933,640 A   6/1990   Kuckes
5,113,953 A   5/1992   Noble
(Continued)

FOREIGN PATENT DOCUMENTS

EP          366567       5/1990

*Primary Examiner* — David Andrews
*Assistant Examiner* — Taras P Bemko
(74) *Attorney, Agent, or Firm* — Chadwick A. Sullivan; Wesley Noah

(57) ABSTRACT

A drill bit assembly for measuring reservoir formation properties comprises a bit head and a pin body, and an electrically insulated gap joint between two conductive parts of the drill bit assembly. The bit head has a cutting end and an opposite connecting end with an engagement section. The pin body comprises a connecting end with an engagement section. The pin connecting end is connected to the bit head connecting end such that the engagement sections overlap. The electrically insulating gap joint can fill a gap between the bit head and pin body engagement sections such that the bit head and pin body are mechanically connected together at the connecting ends but electrically separated. Alternatively or additionally, the pin body can have two pieces which are separated by an electrically insulating gap joint. An electrical conductor is electrically connected at a first end to the bit head and is communicable at a second end with an alternating current signal to transmit an alternating current into the bit head, thereby inducing an electric current into a reservoir formation adjacent the bit head. Electronic equipment includes measurement circuitry configured to determine the alternating current at the bit head, the alternating current being inversely proportional to a bit resistivity of the formation.

20 Claims, 25 Drawing Sheets

(56) References Cited

U.S. PATENT DOCUMENTS

| | | |
|---|---|---|
| 5,265,682 A | 11/1993 | Russell et al. |
| 5,520,255 A | 5/1996 | Barr et al. |
| 5,553,678 A | 9/1996 | Barr et al. |
| 5,553,679 A | 9/1996 | Thorp |
| 5,582,259 A | 12/1996 | Barr |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,706,905 A | 1/1998 | Barr |
| 5,778,992 A | 7/1998 | Fuller |
| 5,803,185 A | 9/1998 | Barr et al. |
| 5,971,085 A | 10/1999 | Colebrook |
| 6,089,332 A | 7/2000 | Barr et al. |
| 6,092,610 A | 7/2000 | Kosmale et al. |
| 6,158,529 A | 12/2000 | Dorel |
| 6,244,361 B1 | 6/2001 | Comeau et al. |
| 6,364,034 B1 | 4/2002 | Schoeffler |
| 6,394,193 B1 | 5/2002 | Askew |
| 7,301,345 B2 | 11/2007 | Chen et al. |
| 7,388,380 B2 | 6/2008 | Chen et al. |
| 2001/0052428 A1 | 12/2001 | Larronde et al. |
| 2002/0011359 A1 | 1/2002 | Webb et al. |
| 2007/0057674 A1 | 3/2007 | Chen et al. |
| 2007/0247328 A1* | 10/2007 | Petrovic et al. ............ 340/853.7 |
| 2009/0066336 A1* | 3/2009 | Dion ............................ 324/355 |

\* cited by examiner

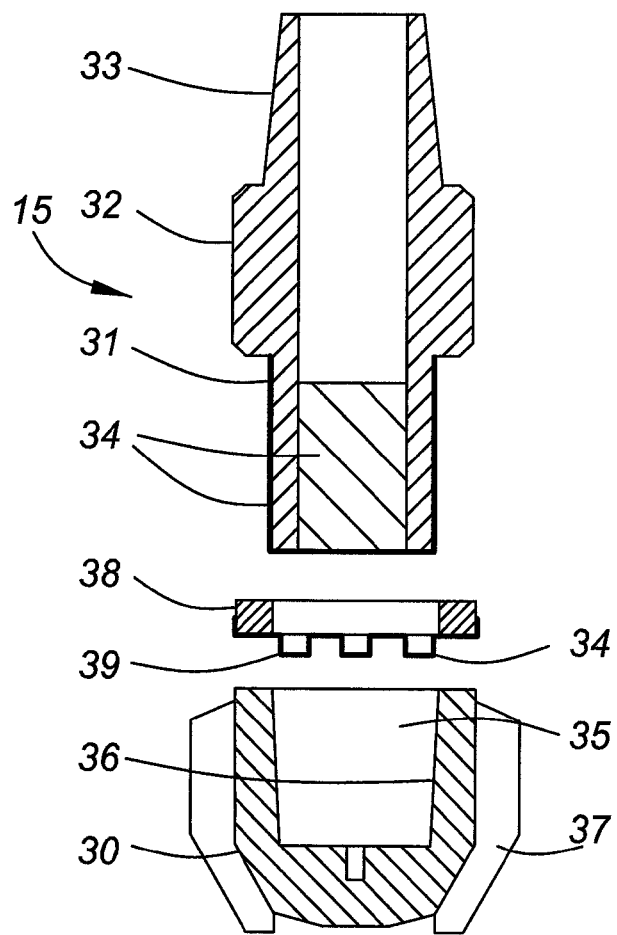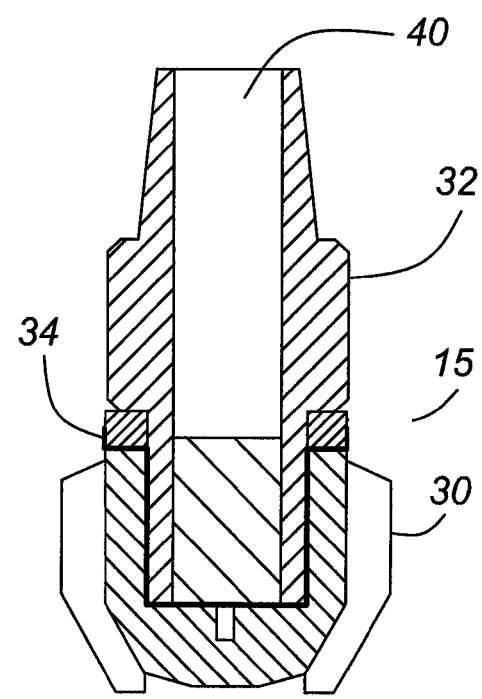
FIG. 3(a)   FIG. 3(b)

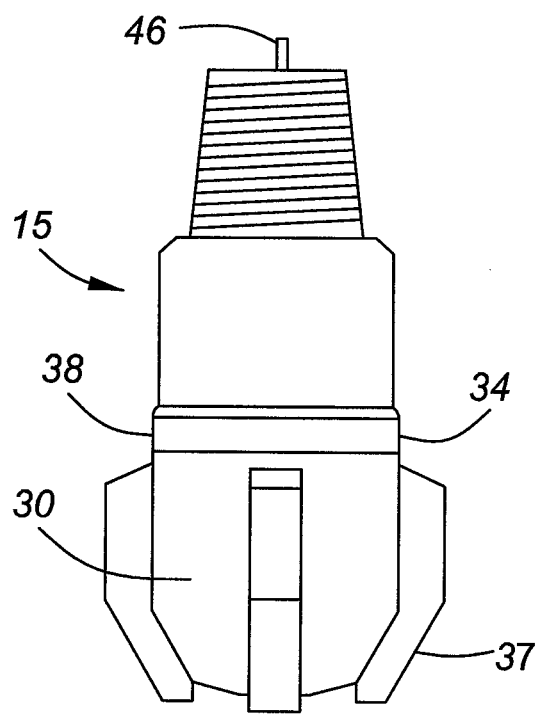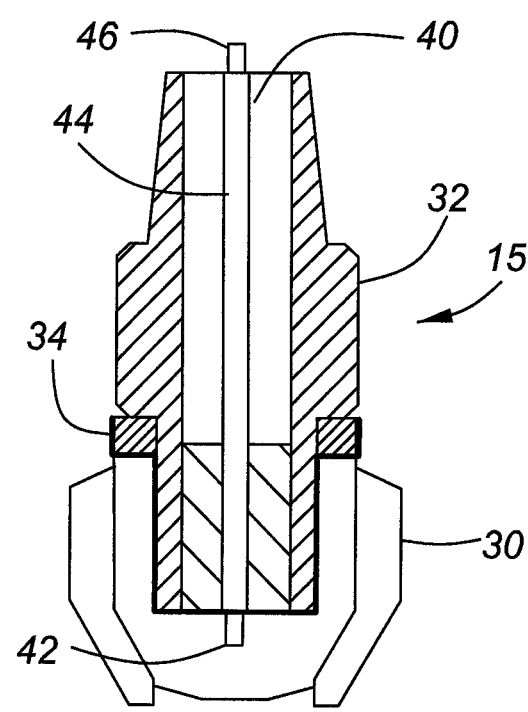
FIG. 4(a)     FIG. 4(b)

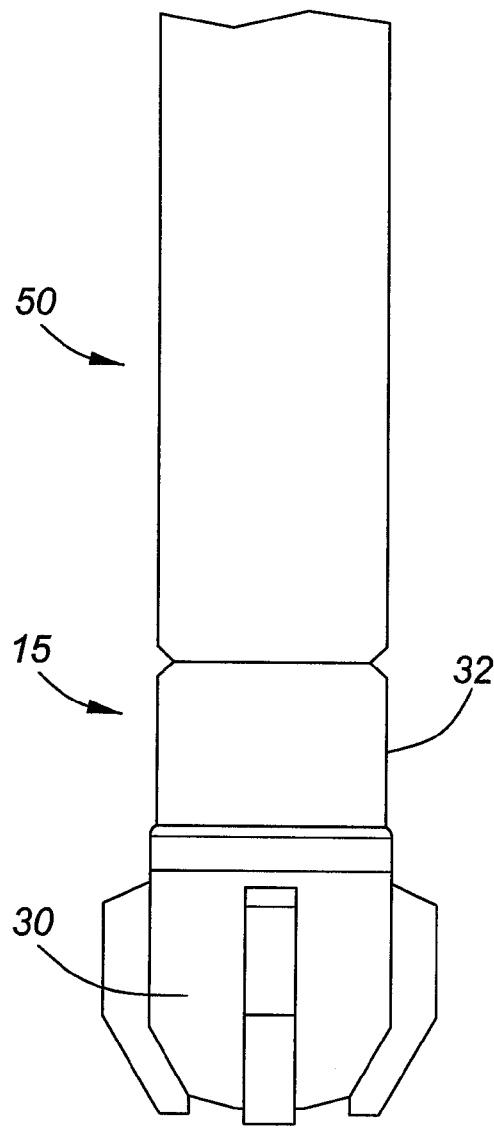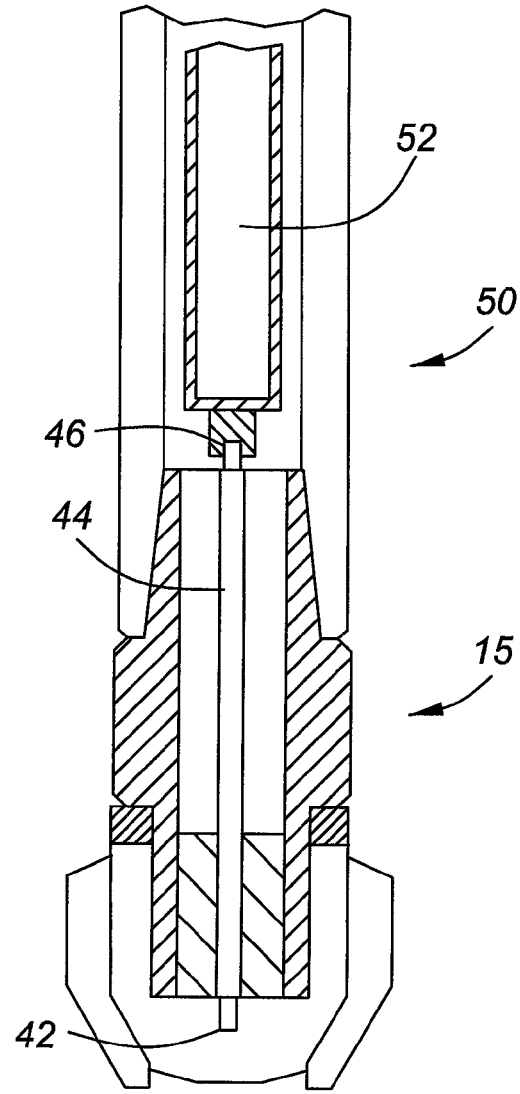
FIG. 5(a) FIG. 5(b)

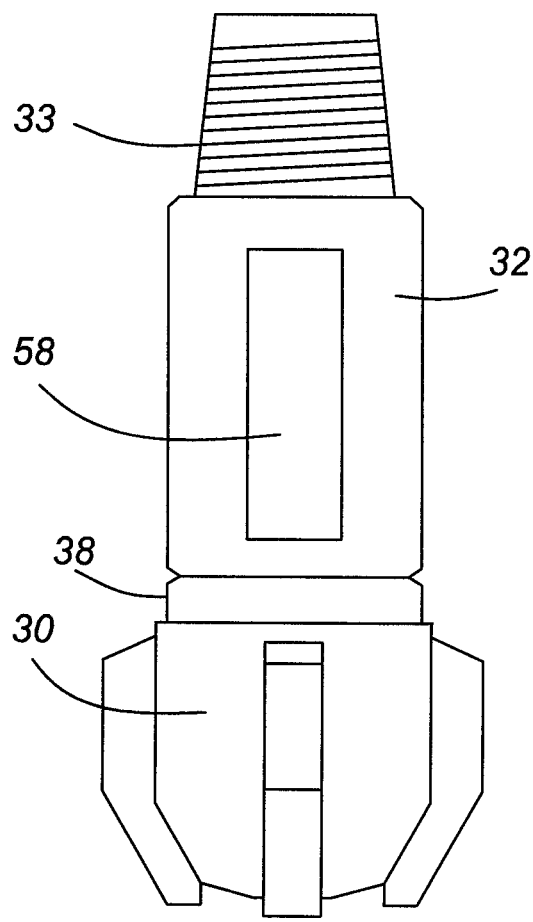 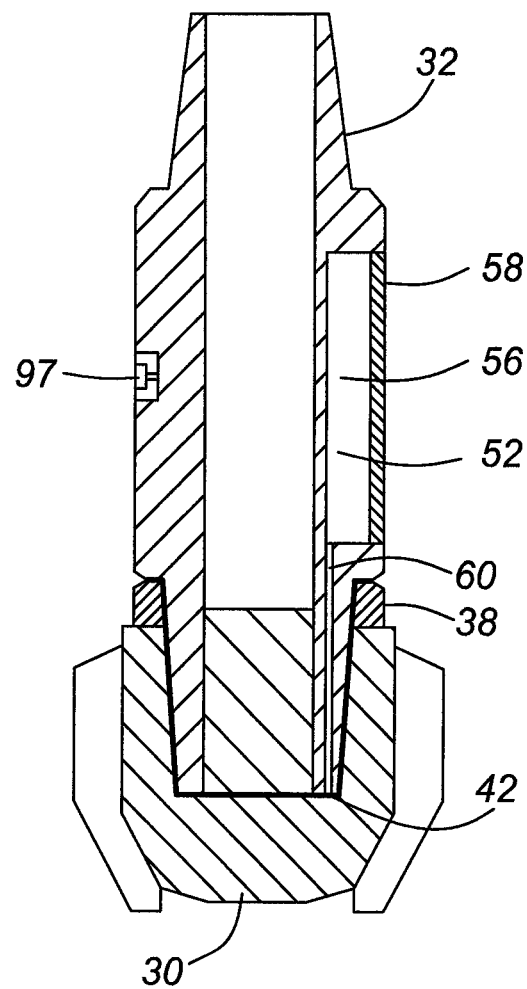
FIG. 6(a)  FIG. 6(b)

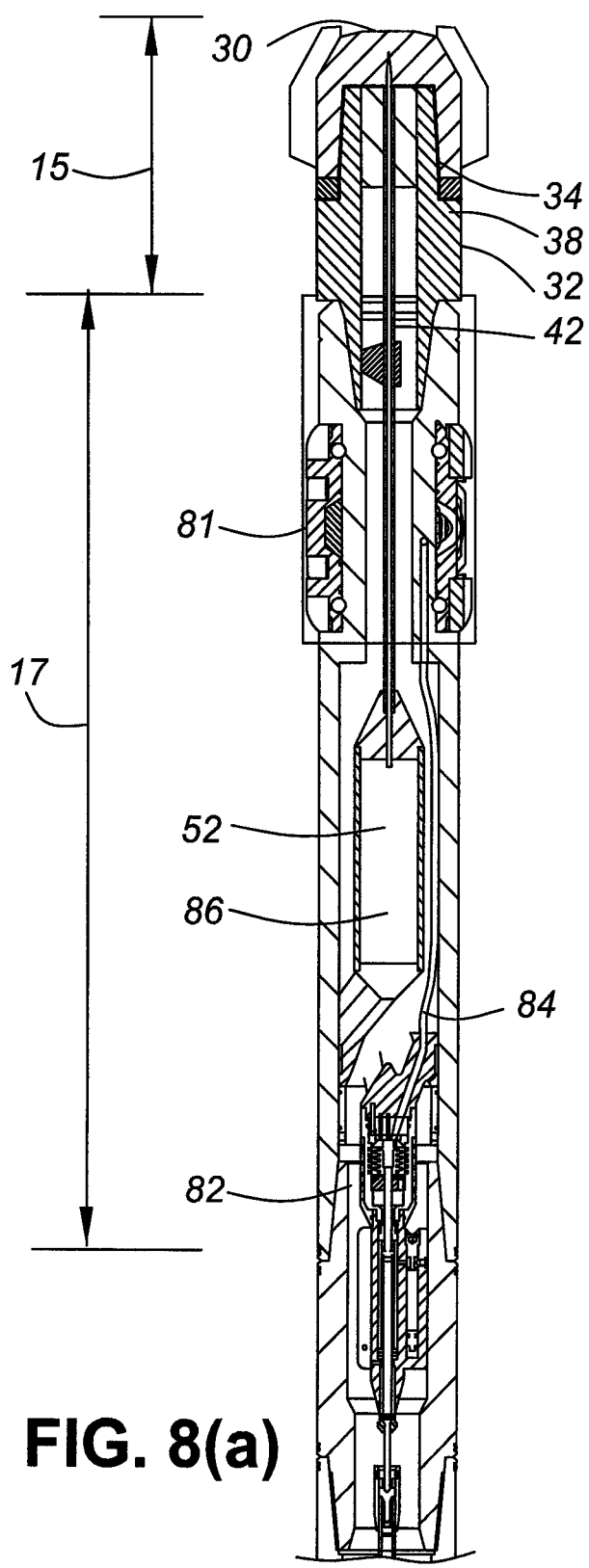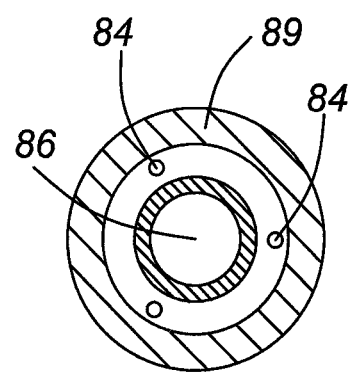
FIG. 8(a)
FIG. 8(b)

DRILL BIT ASSEMBLY HAVING ELECTRICALLY ISOLATED GAP JOINT FOR MEASUREMENT OF RESERVOIR PROPERTIES

CROSS REFERENCE TO RELATED APPLICATIONS

This application is a national stage application under 35 U.S.C. 371 of International Patent Application Number PCT/CA09/01569 filed on Oct. 29, 2009, published as WO/2010/121346 which claims priority of U.S. Provisional Patent Application No. 61/172,192, filed on Apr. 23, 2009 which is hereby incorporated by reference in their entireties.

FIELD OF THE INVENTION

This invention relates generally to drilling equipment used in drilling bore holes in earth formations, and in particular to a drill bit assembly having an electrically isolated gap joint used in measurement of reservoir formation properties.

BACKGROUND OF THE INVENTION

Modern drilling techniques employ an increasing number of sensors in downhole tools to determine downhole conditions and parameters such as pressure, spatial orientation, temperature, gamma ray count etc. that are encountered during drilling. These sensors are usually employed in a process called 'measurement while drilling' (MWD). The data from such sensors are either transferred to a telemetry device, and thence up-hole to the surface, or are recorded in a memory device by 'logging'.

One type of telemetry method is electromagnetic (EM) telemetry, which uses a downhole EM transmitter to create very low frequency EM carrier signal waves in the formation adjacent to the well that are detected at the surface. In EM telemetry systems, the downhole carrier signal is produced by applying an alternating electric current across an electrically isolated (nonconductive) portion of the drill string. The required isolation is provided by a mechanically strong gap in a portion of drill string (called a 'sub') in order to maintain the torsional, bending etc. properties required for the drilling process. The EM signal originating across the gap is subsequently detected on the surface by, in general, measuring the induced electric potential difference between the drill rig and a grounding rod located in the earth some distance away.

Current measurements include resistivity measurements taken by a MWD tool sub that has an insulated gap joint. Because of the lengthy electrically conductive drill collars above and below the gap joint, the vertical resolution is reduced. While the measurements from the MWD tool sub can be used to interpret conditions at the drill bit, the remote location of the MWD tool sub from the drill bit will affect the accuracy of bit resistivity and other measurements.

SUMMARY OF THE INVENTION

According to one aspect of the invention, there is provided a drill bit assembly for measuring reservoir formation properties such as bit resistivity, azimuthal resistivity, and streaming potential of a reservoir formation in the vicinity of the drill bit assembly. The drill bit assembly comprises: an electrically conductive bit head having a cutting end and an opposite connecting end with an engagement section; and an electrically conductive pin body comprising a connecting end with an engagement section. The pin connecting end connects to the bit head connecting end such that the engagement sections overlap. The drill bit assembly also comprises: an electrically insulating gap joint filling a gap between the bit head and pin body engagement sections such that the bit head and pin body are mechanically connected together at the connecting ends but electrically separated, or fills a gap between two other electrically conductive components of the drill bit assembly, such as between two pieces of the pin body. The drill bit assembly also includes an electrical conductor electrically connected at a first end to the bit head and communicable at a second end with an alternating current signal to transmit an alternating current into the bit head, thereby inducing an electric current into a reservoir formation adjacent the bit head; and electronic equipment which includes measurement circuitry configured to determine the alternating current at the bit head, the alternating current being inversely proportional to a bit resistivity of the formation.

The electrical conductor second end can be electrically coupled to the pin body. In such case, the pin body is in electrical communication with an electrically conductive lower drill collar of a MWD module. The MWD module has an electrically insulating gap and is configured to emit the alternating current signal in the form of an electromagnetic wave across the MWD module insulating gap thereby inducing the alternating current in the drill collar.

The electrical conductor can be electrically coupled to the pin body by a coil of a transformer. In particular, the measurement circuitry can comprise a transformer with a first coil and a second coil electrically coupling the conductor to the pin body. The measurement circuitry can also comprise: an amplifier which can be electrically coupled to the first coil; an analog/digital (ND) converter which can be electrically coupled to the amplifier for receiving an amplified analog signal representing the alternating current and converting the signal to a digital signal; and a processor can be electrically coupled to the A/D converter to receive and process the digital signal.

The electronic equipment can further comprise electromagnetic (EM) telemetry circuitry in communication with the processor and configured to transmit data received from the processor as an EM telemetry signal into the formation. The electronic equipment can further include a switch electrically coupled to the conductor and switchable between the EM telemetry circuitry wherein the bit head serves as an EM telemetry antenna, and the measurement circuitry wherein the bit head serves as an electrode for measuring formation properties.

According to another aspect of the invention, the measurement circuitry can comprise a high input impedance operational amplifier having inputs electrically coupled to the pin body and the bit head, and a resistor of known resistance electrically coupled to the amplifier and to the second end of the electrical conductor. An alternating current signal source is coupled to the amplifier such that the alternating current at the bit head is determined from a voltage drop measured across the resistor. The measurement circuitry can further comprise a processor having a memory with instructions for execution by the processor to calculate a bit resistivity from the determined alternating current, and from a measured voltage drop across insulated gap joint.

The drill bit assembly can further comprising azimuthal resistivity electrodes and the electronics equipment can include measurement circuitry in communication with the azimuthal resistivity electrodes and configured to determine azimuthal resistivity of the formation from an alternating current measured at the azimuthal resistivity electrodes. The azimuthal resistivity electrodes can be a button electrode located in at least one of a sidewall of the pin body, and in a cutting face of the bit head. The drill bit assembly can further comprise a streaming potential electrode on the pin body, and the electronics equipment can further include measurement circuitry in electrical communication with the streaming potential electrode and the bit head and configured to measure the voltage difference therebetween and having a processor with a memory having instructions for execution by the processor to determine the streaming potential of a fluid in contact with the drill bit assembly from the measured voltage difference.

According to another aspect of the invention there is provided a drill bit assembly for measuring the streaming potential of a reservoir formation. The drill bit assembly comprises: an electrically conductive bit head having a cutting end and an opposite connecting end with an engagement section; and an electrically conductive pin body comprising a connecting end with an engagement section and a streaming potential electrode on a surface of the pin body. The pin connecting end is connected to the bit head connecting end such that the engagement sections overlap. The drill bit assembly also comprises: an electrically insulating gap joint filling a gap between the bit head and pin body engagement sections such that the bit head and pin body are mechanically connected together at the connecting ends but electrically separated; and electronic equipment including measurement circuitry in electrical communication with the streaming potential electrode and the bit head and configured to measure the voltage difference therebetween and having a processor with a memory having instructions for execution by the processor to determine the streaming potential of a fluid in contact with the drill bit assembly from the measured voltage difference.

According to yet another aspect of the invention, there is provided a method for measuring reservoir formation properties by a drill bit assembly comprising: in a drill bit assembly, transmitting an alternating current from an alternating current signal to a bit head thereby inducing an electromagnetic wave into a reservoir formation adjacent the bit head, the bit head being mechanically connected to but electrically separated from a pin body of the drill bit assembly by an electrically insulating gap joint; and determining the alternating current at the bit head, the alternating current being proportional to a bit resistivity of the formation.

The alternating current signal can be an electromagnetic wave generated by a MWD module having an electrically insulating gap joint. The electromagnetic wave crosses the MWD module gap joint and into an electrically conductive lower drill collar of the MWD module to induce the alternating current which conducts from the lower drill collar to the pin body which is electrically coupled to the lower drill collar. The pin body is also electrically coupled to a conductor which crosses the drill bit assembly gap joint to contact the bit head.

The method can further comprise transmitting an electromagnetic telemetry signal including the determined alternating current from the drill bit assembly to the MWD module and determining at the MWD module the bit resistivity from the determined alternating current, and a voltage drop across the MWD module insulating gap. The method can further comprise determining azimuthal resistivity of the formation by measuring an alternating current at an azimuthal resistivity electrode on the drill bit assembly. Finally, the method can further comprising determining a streaming potential of the formation by measuring a voltage difference between a streaming potential electrode on the surface the pin body and the bit head.

According to another aspect of the invention, there is provided a drill bit assembly for measuring reservoir formation properties, comprising an electrically conductive bit head having a cutting end and an opposite connecting end with an engagement section and an electrically conductive pin body comprising a connecting end. The pin body is connected to the bit head at their respective connecting ends. At least one of the bit head and pin body comprises two mating pieces each with a mating end positioned relative to each other such that a gap is formed therebetween; an electrically insulating gap joint fills the gap between the two pieces of the bit head or pin body or both such that the two mating pieces are mechanically connected together at the mating ends but electrically separated. An electrical conductor extends across the gap joint and is electrically coupled at a first end to the bit head and communicable at a second end with an alternating current signal to transmit an alternating current into the bit head, thereby inducing an electric current into a reservoir formation adjacent the bit head. Electronic equipment including measurement circuitry is configured to determine the alternating current at the bit head, wherein the alternating current is inversely proportional to a bit resistivity of the formation.

According to yet another aspect of the invention, there is provided a drill bit assembly for measuring reservoir formation properties, comprising an electrically conductive bit head having a cutting end and an opposite connecting end and an electrically conductive pin body comprising a connecting end and a streaming potential electrode on a surface of the pin body. The pin body is connected to the bit head at their respective connecting ends. At least one of the bit head and pin body comprises two mating pieces each with a mating end positioned relative to each other such that a gap is formed therebetween; an electrically insulating gap joint fills the gap between the two pieces of the bit head or pin body or both such that the two mating pieces are mechanically connected together at the mating ends but electrically separated, and wherein the gap joint also electrically separates the streaming potential electrode from at least part of the bit head. Electronic equipment including measurement circuitry is in electrical communication with the streaming potential electrode and the at least part of the bit head that is electrically separated from the streaming potential electrode; the measurement circuitry is configured to measure the voltage difference therebetween and has a processor with a memory having instructions for execution by the processor to determine the streaming potential of a fluid in contact with the drill bit assembly from the measured voltage difference.

BRIEF DESCRIPTION OF THE DRAWINGS

FIGS. 3(a) and (b) are schematic sectional elevations views of a drill bit assembly in dissembled and assembled forms according to a first embodiment.

FIGS. 4(a) and (b) are schematic exterior and sectional elevations views of the drill bit assembly having a conductor extending through an axial bore of the drill bit assembly.

FIGS. 5(a) and (b) are schematic exterior and sectional elevations views of the drill bit assembly of the first embodiment connected to an electronics & power sub.

FIGS. 6(a) and (b) are schematic exterior and sectional elevations views of the drill bit assembly having an annular pin body with an electronics housing in the body according to another embodiment.

FIGS. 8(a) and (b) are schematic side and cross sectional views of the drill bit assembly of the first embodiment connected to a rotary steerable system (RSS) sub having electronics mounted in a mandrel of the sub.

DETAILED DESCRIPTION OF EMBODIMENTS OF THE INVENTION

Drill String

Figure 1:
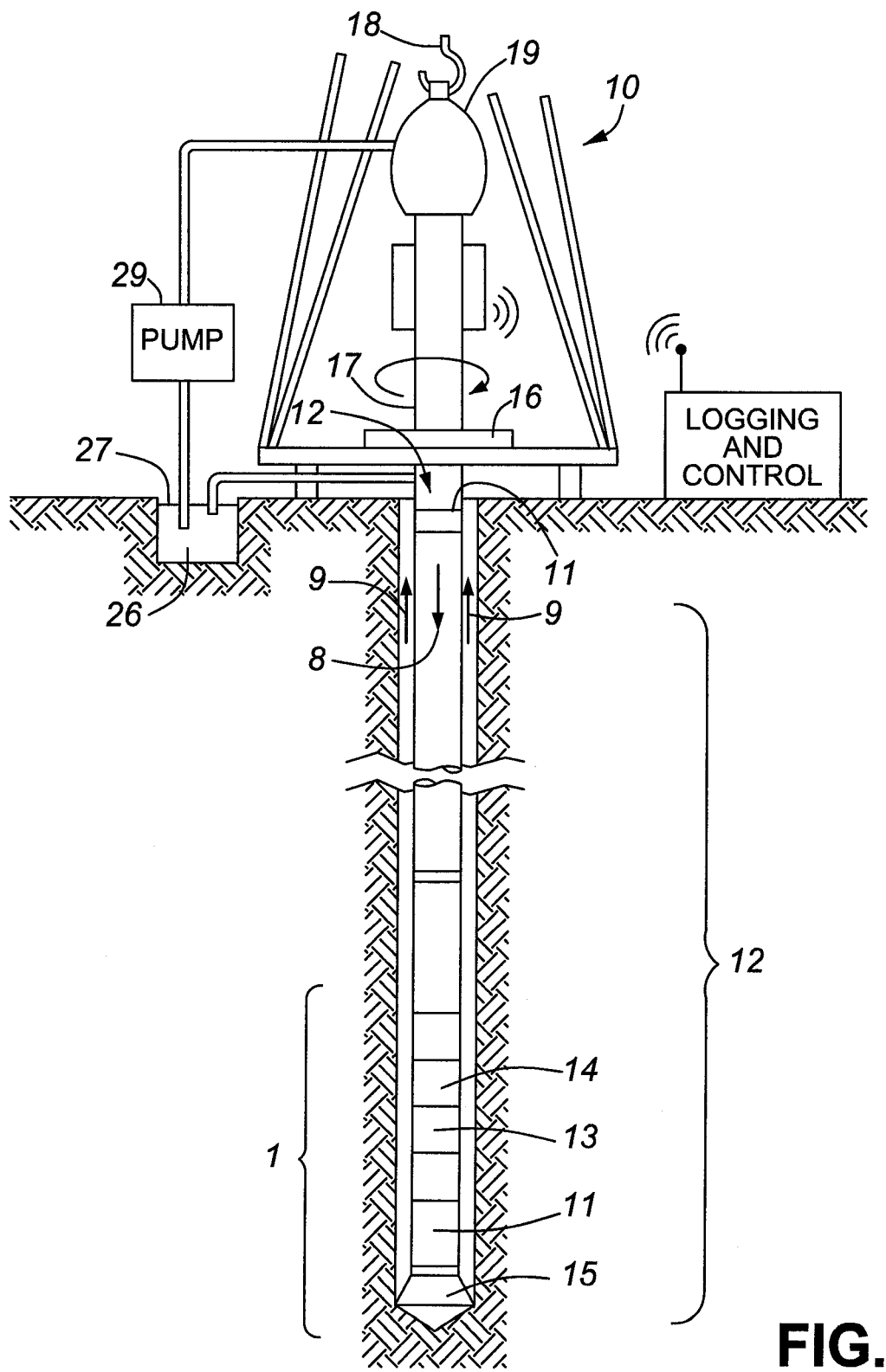
FIG. 1 is a schematic of a drill bit assembly attached to other components in a drill string according to one embodiment of the invention, in use in a well site.

FIG. 1 illustrates a wellsite system in which a drill string 12 having a drill bit assembly 15 according to one embodiment of the invention can be employed. The wellsite can be onshore or offshore. This exemplary system depicts a vertical well but the invention is also applicable for horizontal well drilling. In FIG. 1 a borehole 11 is formed in subsurface formations by rotary drilling in a manner that is well known. Embodiments of the invention can also use directional drilling, as will be described hereinafter.

The drill string 12 is suspended within the borehole 11 and has a bottom hole assembly 1 which includes the drill bit assembly 15 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string 12 relative to the hook 18. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports (not shown) in the drill bit assembly 15, and then circulates upwardly through the annulus region between the outside of the drill string and the wall of the borehole, as indicated by the directional arrows 9. In this well known manner, the drilling fluid lubricates the drill bit assembly 15 and carries formation cuttings up to the surface as it is returned to the pit 27 for recirculation.

The bottom hole assembly (BHA) 1 of the illustrated embodiment comprises a logging-while-drilling (LWD) module 14, a measuring-while-drilling (MWD) module 13, a roto-steerable system and motor 17, and the drill bit assembly 15.

The LWD module 14 is housed in a special type of drill collar, as is known in the art, and can contain one or a plurality of known types of logging tools. It will also be understood that more than one LWD and/or MWD module can be employed. The LWD module includes capabilities for measuring, processing, and storing information, as well as for communicating with the surface equipment. In the present embodiment, the LWD module includes a pressure measuring device.

The MWD module 13 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module may include one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling". In this embodiment, a roto-steerable subsystem 17 (FIG. 1) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of an planned drilling trajectory because of the unpredictable nature of the formations being penetrated or the varying forces that the drill bit experiences. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut side ways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; 5,971,085 all herein incorporated by reference.

Drill Bit Assembly

In each of the embodiments described and shown in FIGS. 3 to 25, the drill bit assembly 15 has a bit head 30 and a double pin body 32 with an electrically isolating gap joint 34 in between the mating portions of the bit head 30 and the pin body 32. The gap joint 34 has electrically insulating properties and electrically separates the bit head and pin body 32, which are both electrically conductive. The gap joint 34 is also impermeable to fluid and maintains its electrical resistance under high hydrostatic pressures, thereby preventing conductive fluid from shorting across the small thread gap between the pin body and bit head 32, 30. In some embodiments, an electronics housing is provided in the drill bit assembly 15 that houses electronics comprising resistivity measurement equipment and an electromagnetic (EM) transceiver assembly which has a conductor that extends from the electronics housing to contact another part of the drill bit assembly 15 across the gap joint 34. In some other embodiments, electronics are housed in a nearby tool up-hole and the conductor extends from the drill bit assembly 15 to these electronics.

Figure 2A:
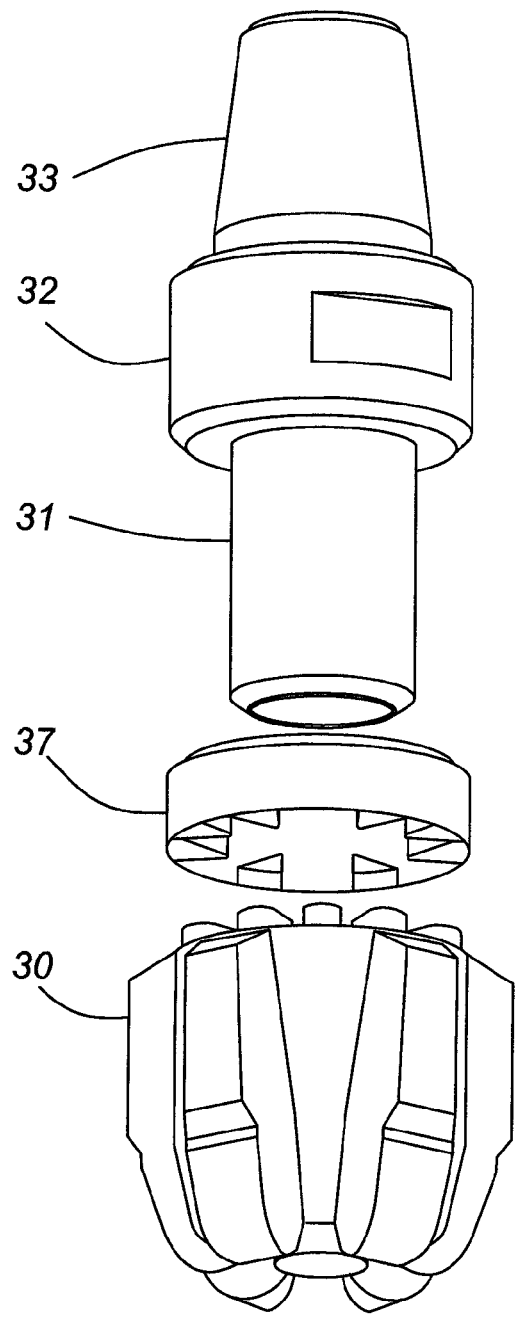
FIGS. 2(a) and (b) are schematic perspective views of a conventional drill bit assembly in partially dissembled and assembled forms (PRIOR ART).
Figure 2B:
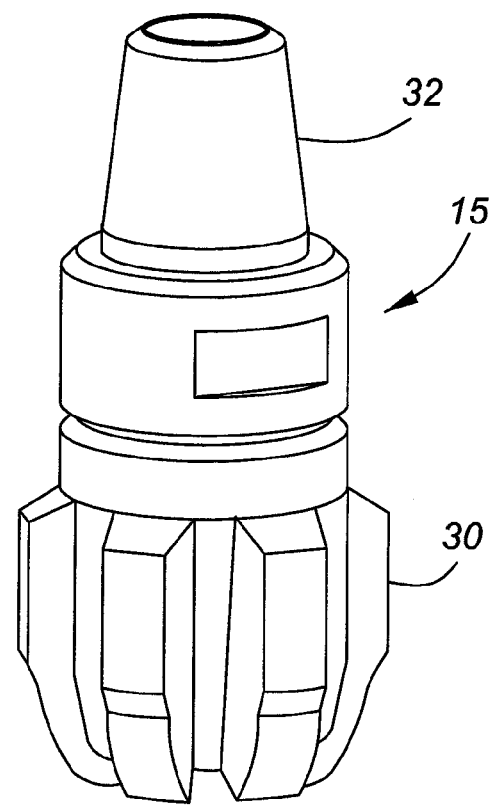

A first embodiment of the drill bit assembly 15 is shown in detail in FIGS. 3 to 5 and 7 to 10. The drill bit assembly 15 can be a modification of a known drill bit assembly, such as those manufactured by Lyng Drilling and as shown in FIGS. 2(a) and (b), or be bespoke. The bit head 30 in this embodiment is a matrix head and has a crown with a cutting end and an opposite pin engagement end. A female threaded axial bore 35 extends from the pin engagement end into the body of the bit head 30; keyholes (not shown) are spaced around the annular body and extend into the engagement end. The bit head 30 has a one piece body made of tungsten carbide in a manner that is well known in the art. Alternatively, the bit head 30 can have a two piece body comprising a tungsten carbide crown brazed onto a steel tubular body with a female threaded axial bore (not shown).

The cutting end of the bit head 30 has a plurality of blades 37. Attached to each blade 37 are a plurality of cutting elements (not shown); suitable such cutting elements include those made from polycrystalline diamond compact (PDC), cubic boron nitride, or other super hard materials as is known in the art. The bit head 30 also has a plurality of drilling fluid discharge ports (not shown) which extend from the end of the axial bore 35 to the exterior surface of the cutting end of the bit head 30. The axial bore 35 has female threads 36, ("female threaded section").

While a matrix head is shown as the bit head 30 in this embodiment, other types of bit heads can be substituted, such as a tri-cone bit head (not shown).

The pin body 32 is made of a 4130 high strength steel alloy but can alternatively be made of any suitable material as known in the art. The pin body 32 has a generally tubular body with two connecting pin ends, which are a threaded gap joint pin end for engagement with the bit head 30, and a tapered API pin end 33 for engagement with the rest of the bottom hole assembly 1. An axial bore 40 extends through the pin body to allow drilling fluid to flow therethrough and to the ports of the bit head 30.

The crown and tubular body are secured together by a lock ring 38 mechanically fastened to the bit head 30 and welded to the pin body 32. The lock ring 38 has a plurality of keys 39 spaced around the lock ring 38 and designed to engage the keyholes in the engagement end of the bit head 30, thereby mechanically fastening the bit head 30 to the lock ring 38. The lock ring 38 is made of a weldable material such as 4130 high strength steel.

Before the pin body 32 and bit head 30 are joined, male threads 31 on the double pin body are coated with a thin non-conductive layer such as a ceramic to form an electrically insulating gap joint 34 between the bit head 30 and pin body 32. The ceramic layer is also applied to the rim of the gap joint pin end, and may also be applied along the part of the bore 40 surface connected to the rim. The insulating ceramic layer 34 on the bore 40 surface increases the electrical resistance between the bit head 30 and the double pin body 32. Any location where the double pin body 32 either touches the bit head 30, or is very close to the bit head body, can also be coated with the ceramic layer 34. The locking ring 38 is also coated with the ceramic layer 34 on any surfaces that touches the bit head 30, including the keys 39 or key holes. For ease of coating with ceramic material 34, it may be preferable to mount the keys 39 on the locking ring 38, and to locate the key slots in the bit head body, although in an alternative embodiment the keys 39 and keyholes can be reversed, i.e. keys on the bit head 30 and key holes in the locking ring 38. In addition, the outer surface of the locking ring 38 can also be coated with ceramic or another insulating material so as to provide some electrical separation between the bit head 30 and the locking ring 38.

The drill bit assembly 15 is assembled using the same general procedures for assembly a conventional drill bit assembly, but with a few changes to account for the ceramic gap joint 34. Because the ceramic coated male threads 31 have to be tightened to a precise torque, it may be necessary to use an assembly jig (not shown) to measure the ceramic coated male threads 31, and then to machine the uncoated face (upper surface) of the locking ring 38 to achieve the correct torque. After the double pin body 32, locking ring 38, and matrix body 30 are assembled and tightened to the proper torque, the locking ring 38 is welded to the double pin body 32. An optional final step is to impregnate the insulated gap joint 34 with an epoxy.

While a locking ring 38 with keys 39 is shown in this embodiment, alternative embodiments do not require keys with matching keyholes and can provide alternate means for securing the lock ring to the bit head as would be known to one skilled in the art. For example, the locking ring 38 may be fabricated without keys and used soley as a spacer between the double pin body 32 and matrix body 30, in which case the locking ring 38 may or may not be welded to the double pin body 32. Alternatively, the matrix body 30 may be threaded directly onto the double pn body 32 without a locking ring.

The assembled drill bit assembly 15 with an insulated gap join 34 is shown in FIGS. 4(*a*) and (*b*). An elongated insulated electrical conductor such as an electrically conductive metal rod 42 with an insulated covering 44 is attached to the bit head 30 on one end, and has an electrical connection on the other end 46. The rod 42 can simply be threaded into the body of the bit head 30, for example. Alternatively, the rod 42 can plug into an electrical connector mounted in the matrix body (not shown). The rod insulated covering 44 can be a ceramic coating or a sleeve (e.g. peek). It may be desirable to provide a centralizer for the insulated rod (not shown) which would serve to align the connecting end of rod 42 during make-up to the drill collar above the drill bit assembly 15.

The rod 42 provides an electrical connection between the matrix body and a sub 50 run above the drill bit assembly 15 (see FIG. 5). This sub 50 could be a drill collar, a mud motor, or a rotary steerable system as known in the art. The sub 50 may contain electronics, power supply, and sensors (collectively "electronics equipment 52"), and can take the form of several different embodiments, as will be described in detail below.

Alternatively and as shown in FIG. 6, the electronics equipment 52, particularly a power supply (battery) and electronics may be mounted in the double pin body 32 of the drill bit assembly 15. These may be mounted in pressure-tight pockets 56 in the annular part of the double pin body 32 which are covered with cover plates 58. In addition, other sensors such as inclinometers, accelerometers, magnetometers, or temperature sensors can be mounted in the pockets 56. Optionally, external sensors, such as electrodes (97), can also be implemented in the drill bit assembly 15. The bit head 30 body is electrically connected to the electronics equipment 52 in the double pin body 32 by an elongated conductor such as a wire or the insulated rod 42. In this embodiment, a gun-drilled hole 60 is provided through the lower pin portion (i.e. gap joint engagement end) of the pin body 32. The insulated rod 42 (or wire) connects the electronics equipment 52 in the pockets 56 to the bit head 30 body. A spring-loaded contact (not shown) is located in the hole 60 used to apply sustained pressure and cause the rod 42 to make firm electrical contact with the bit head body.

Drill bits are dispensable items, and usually last only a few days before they are now longer able to efficiently cut rock. If electronics equipment 52 are integrated into the drill bit assembly 15 as they are in the embodiment shown in FIG. 6, then they might be recovered from a worn bit at a field location and re-used. However, the double pin body 32 with the insulating gap joint 34 might have to be recycled to a manufacturing facility for rework. Hence, it may be desirable to locate the electronics equipment in a separate sub and thus reduce the cost of the insulated bit assembly.

The embodiment shown in FIG. 5 locates the electronics equipment 52 in a separate tool sub 50 and uses the drill bit assembly 15 as shown in FIGS. 3 and 4. Such a drill bit assembly 15 is a simpler design than the drill bit assembly 15 shown in FIG. 6 and should thus be simpler and less expensive to use and maintain. If the bottom hole assembly 1 does not include a steerable system 17, then a drill bit assembly 15 according to either embodiment can be run without much difficulty. However, if the steerable system 17 is used, then it becomes more difficult to implement the drill bit assembly 15 with a separate tool sub 50, as the separate tool sub 50 results in a significantly longer drill bit assembly 15 that may not be compatible with a directional drilling assembly that uses a positive displacement motor (PDM) and bent sub, or a rotary steerable system (RSS) 17, the electronics equipment 52 can be integrated into existing parts of the bottom hole assembly 1.

Figure 7:
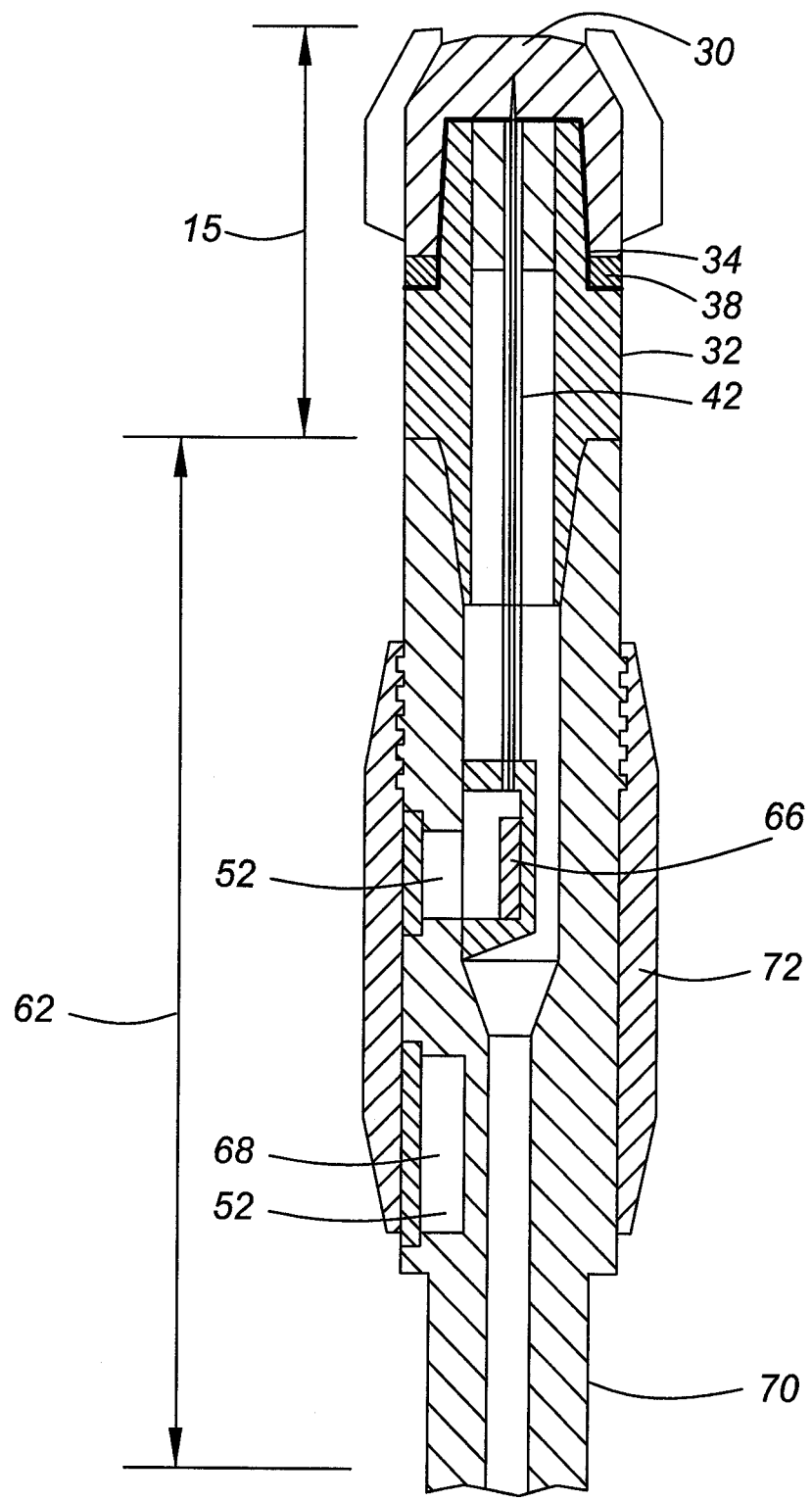
FIG. 7 is a schematic sectional view of the drill bit assembly of the first embodiment connected to a bent sub assembly.
Figure 9A:
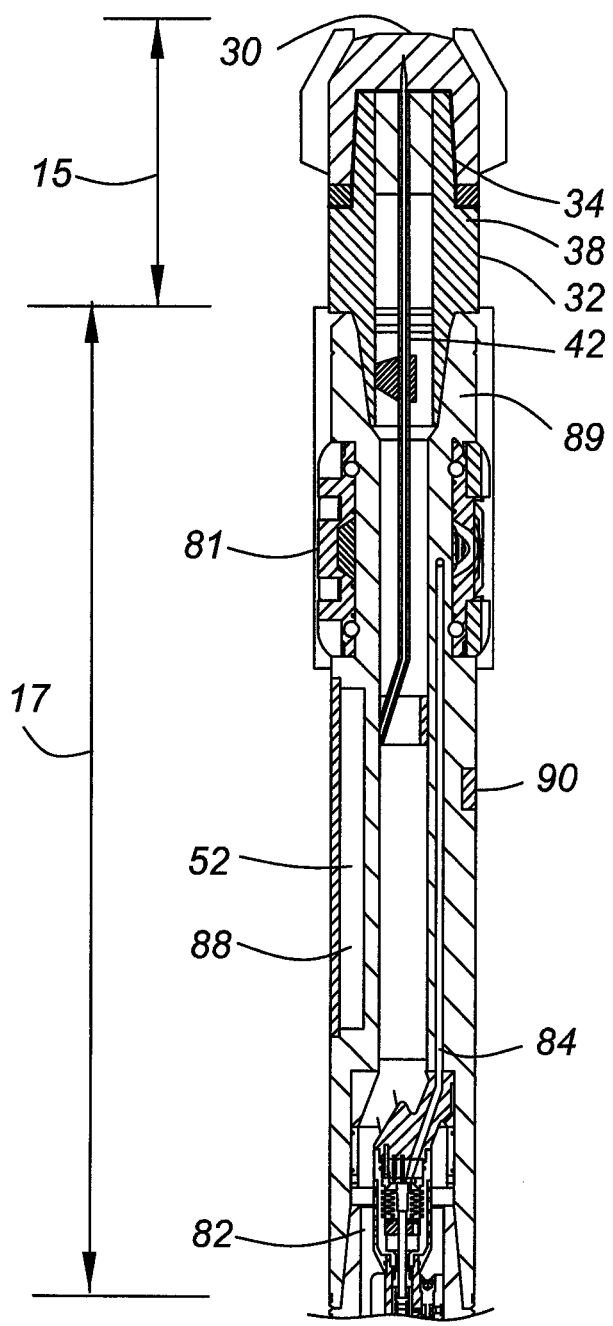
FIGS. 9(a) and (b) are schematic side and cross sectional views of the drill bit assembly of the first embodiment connected to a RSS sub having electronics mounted in a sidewall of the sub.
Figure 9B:
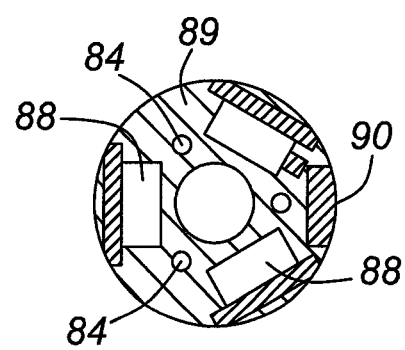
Figures 10A, 10B:
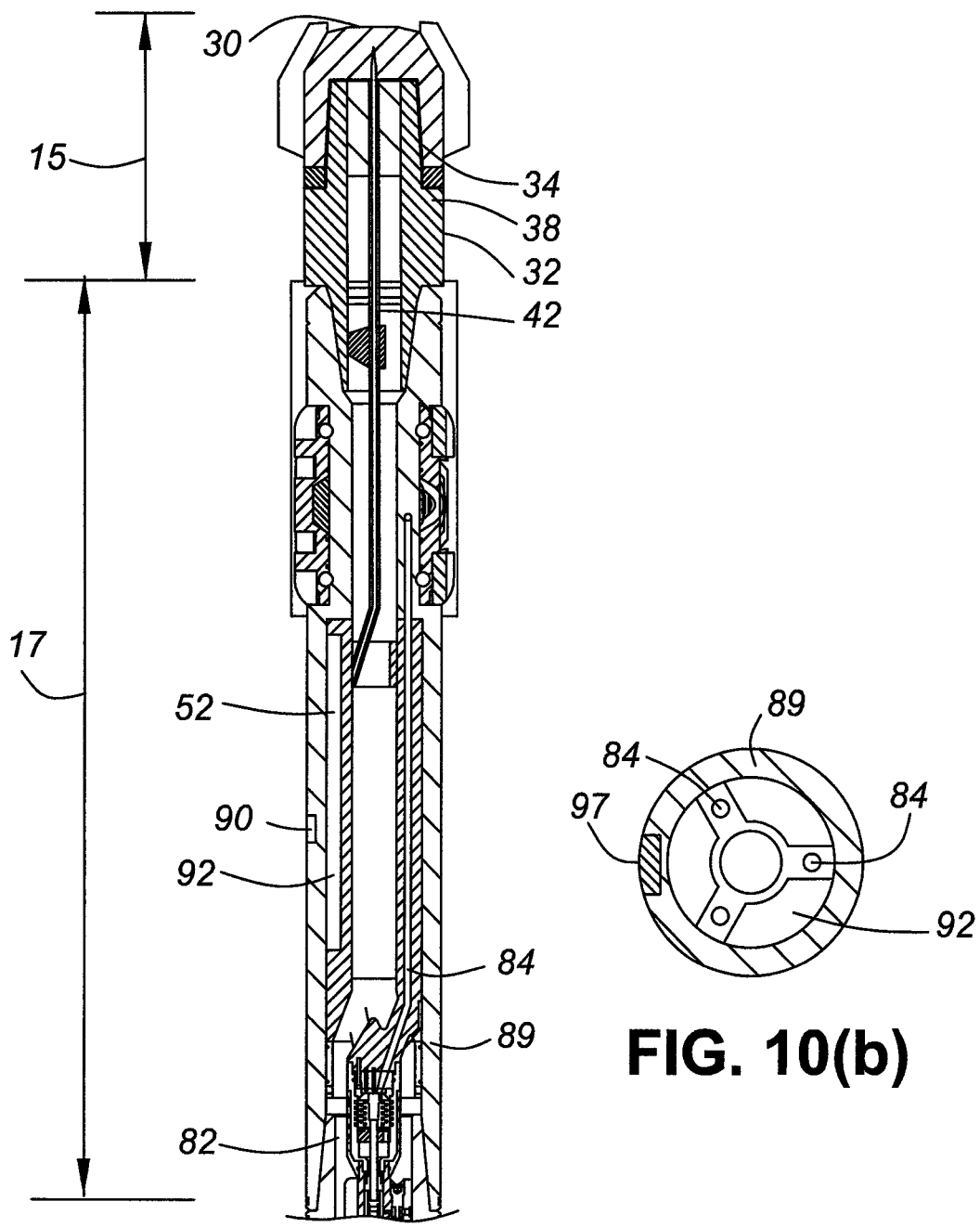
FIGS. 10(a) and (b) are a schematic side and cross sectional views of the drill bit assembly of the first embodiment connected to a RSS sub having electronics mounted in an annular region of the sub.

The following embodiments described below and shown in FIGS. 7 to 10 locate the electronics equipment 52 in a separate part of the bottom hole assembly 1 and use the embodiment of the drill bit assembly 15 as shown in FIGS. 3 and 4, and are compatible with drill strings with steerable systems. FIG. 7 shows an embodiment wherein the electronics equipment are packaged in a bit box assembly of a bent sub in directional drilling assembly that uses a PDM and a bent sub. FIGS. 8 to 10 show embodiments wherein the electronics equipment are packaged in a bias unit of the RSS 17.

According to another embodiment, a thermoplastic may be used instead of ceramic to form the insulating gap. When using thermoplastic, the thermoplastic can be injected into a gap between the connecting ends of the pin body 32 and matrix head 30.

The drill bit assembly 15 is assembled by loosely screwing the threaded ends of the bit head and pin body 30, 32 together in an axially symmetric arrangement on a mandrel (not shown) which extends through the bores of the pin body and bit head. The mandrel also secures the pin body 32 and bit head 30 in place with a gap between the engagement sections of these two parts, and also serves to prevent thermoplastic material from spilling into the bores of the pin body and bit head.

Then, the threaded connecting ends of the bit head and pin 30, 32 are fixed in a mold of an injection molding machine (not shown) such that the tapered threads overlap but do not touch. Such injection molding machine and its use to inject thermoplastic material into a mold is well known the art and thus are not described in detail here. The mold is designed to accommodate the dimensions of the loosely screwed together drill bit assembly 15 in a manner that the thermoplastic injected by the injection molding machine is constrained to fill the gaps in between the threads. Optionally, the assembly 15 can be evacuated first before injecting the thermoplastic.

Then, the thermoplastic material is heated to between 363° C. and 371° C. and preferably about 370° C. until the thermoplastic is in liquid form, and then is injected ("injectant") into an equidistant gap formed between the threads of the bit head and pin body 30, 32 until the bores are physically separated by thermoplastic material, into the annular recess circumscribing the pin body 32 up to but not spilling over edge of the rim. Wear rings can be embedded in the thermoplastic material to protect the seal against wear. The mold temperature, thermoplastic temperature, flow rate, and pressure required to beneficially flow the injectant and completely fill these spaces are selected in the manner as known in the art. The mold and bit head 30 and pin body 32 are also heated, to about 150° C. so that these parts do not cause the thermoplastics to cool too quickly and solidify prematurely and not completely fill the gap. Once filled, a holding pressure (typically ~16,000 psi) is maintained until the thermoplastic injectant cools and solidifies and the thermoplatstic gap joint 34.

The pin body 32 and bit head 30 can be provided with elongated grooves through the threads (not shown). The thermoplastic material will fill these grooves and form anti-rotation barriers protruding from the gap joint, and impeding the pin body 32 from rotating relative to the bit head 30.

After the thermoplastic material solidifies and become mechanically rigid or set, formation of the thermoplastic gap joint 34 with sealing and anti-rotation barriers is complete and the bit head 30 and pin body 32 can be removed from the injection molding machine. The thermoplastic gap joint 34 now firmly holds the bit head 30 and pin body 32 together mechanically, yet separates the bit head 30 and pin body 32 electrically. The thermoplastic gap joint 34 also provides an effective drilling fluid barrier between the inside and outside of the drill bit assembly 15.

The thermoplastic gap joint 34 is generally annular, having an annular outer rim adjacent the exterior surfaces of the bit head 30 and pin body 32, an annular inner rim which separates the axial bores of the bit head 30 and pin body 32, and an annular undulating interconnect portion interconnecting the outer and inner rims. The outer and inner end rims are respectively exposed on the outer and inner surfaces of the drill bit assembly 15 with sufficient distance between the bit head and pin 30, 32 to provide the electrical isolation necessary for the drill bit assembly to serve as an EM telemetry emitter for example.

Figure 27C:
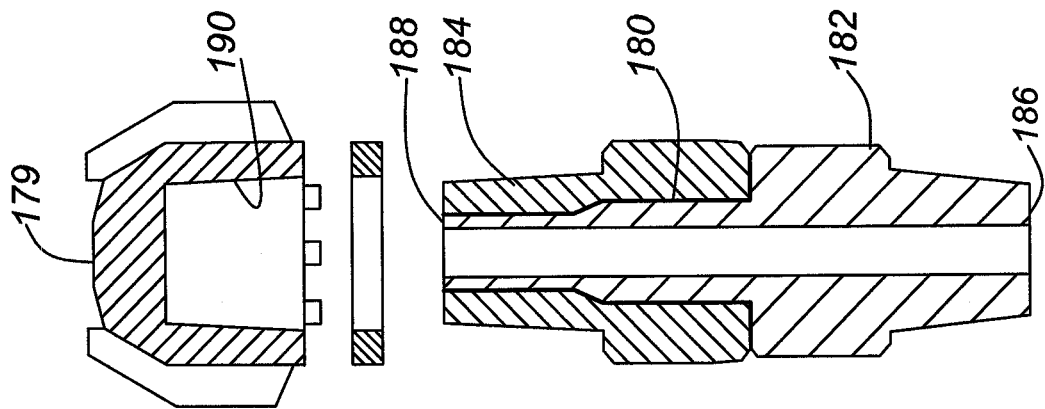
FIGS. 27(a) to (c) are a schematic exterior assembled and sectioned assembled and dissembled views of a two piece pin body having an electrically insulating gap joint between two pieces of the pin body according to another embodiment.
Figure 27B:
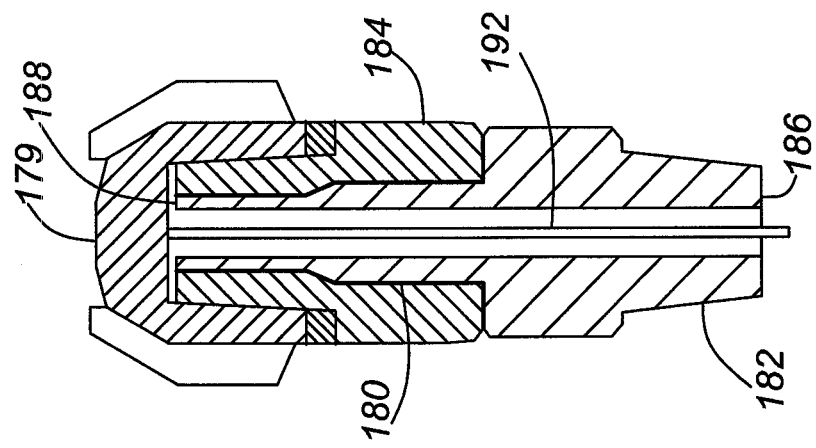
Figure 27A:
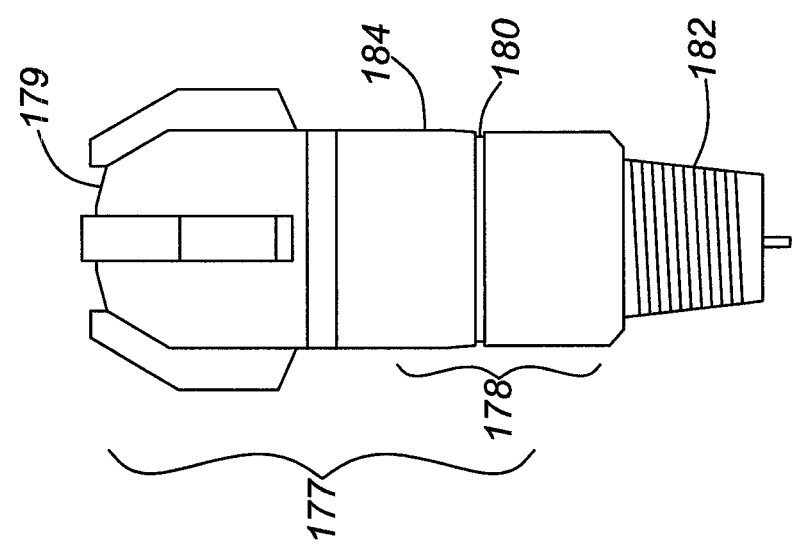

According to another alternative embodiment and referring to FIGS. 27(a) to (c), a drill bit assembly 177 having a two piece pin body 178 is provided with an insulating gap joint 180 between the engagement sections of the two pieces of the pin body 178. This second insulating gap joint 180 can be provided instead of or in addition to a gap joint (not shown) between the engagement sections of the pin body 178 and the bit head 179. In this alternative embodiment, the pin body 178 has an API pin piece 182 and a bit head pin piece 184. The API pin piece 182 has an API pin end 186 and a male threaded gap joint pin end 188. The male threads on the API pin piece 182 are threaded into female threads on bit head pin piece 184. The threads may have two different diameters to increase the holding strength of this connection. A thermoplastic injection technique as described for forming gap joint 34 can be applied to form the gap joint 180. Cavities or grooves (not shown) can be provided on the surface of one or both of the gap joint pin end 188 and bit head pin piece 184, in which thermoplastic will fill to form anti-rotation barriers (not shown). The bit head 179 has a female threaded bore 190 which mates with the male threads of gap joint pin end 188. A conductor 192 can cross the gap joint 180 and have one end contacting either the pin body 178 or as shown in these Figures, the bit head 179, and the other end in communication with electronics equipment such as EM telemetry circuitry or reservoir formation measurement equipment (not shown). The conductor 192 can extend through aligned ports in the annular portions of the API pin piece 182 and bit head pin piece, or as shown in these Figures, through the axial bore 190 of the pin body 178.

In yet another alternative embodiment, a two piece bit head is provided (not shown) and another insulating gap joint is provided between the two pieces of the bit head. Thermoplastic injection techniques as described above can be applied to form the gap joint. A conductor can be extended across the gap joint to have one end contact one of the bit head pieces and the other end to communicate with electronics equipment.

In yet another embodiment, other materials other than thermoplastic or ceramic can be used to form the gap joints 34, 180. The material can be an epoxy, or another polymer based material. Instead of pressurized injection, the thermoplastic, epoxy and other polymer based materials can fill the gap and barrier-forming cavities by potting, then solidified by curing. Curing can be done at atmospheric pressure, or more preferably under pressure to prevent or minimize the tendency for the material to expand out of the gap. The metal and ceramic can be liquefied then cast into the gap and barrier forming cavities. Casting and potting can be performed at either atmospheric pressure or under a vacuum to gain the benefit of increased face friction between the joint material and the connecting parts. Instead of pouring a liquid ceramic into the gap, a ceramic powder can be applied into the gap then sintered to form the gap joint. Alternatively, a ceramic green compact can be machined to the exact dimensions of the gap (or produce a mold to compress the ceramic powder into a green compact with exact dimensions), and screw the bit head having a ceramic green compact screwed into the compact till the bit head bottoms, then screw the pin body into the compact this till the pin body bottoms. Then the barrier forming cavities would be filled with ceramic powder, the ceramic powder is then sintered to produce the gap and barriers.

Mud Motor and Bent Sub with Drill bit Assembly

Referring to FIG. 7, a bent sub assembly is mounted below a positive displacement motor (not shown) and has a bit box 62 which houses the electronics equipment 52.

The bit box may include an inclinometer 66, electronics with battery 68, gamma-ray detector (not shown), shock, vibration, temperature, or other sensors. The bit box may also have a full gauge stabilizer 72 which may be needed for directional control. Otherwise, the increased length of the BHA below the bent sub can cause drifts.

A drive shaft 70 connects the bit box to the bent sub (not shown). The screw-on stabilizer 72 can be sized to match the drill bit assembly 15, and may cover the pockets that contain electronics and battery. An inclinometer 66 can be mounted in the center of the assembly, on axis. The insulated rod 42 connects the bit head 30 to the electronics equipment 52 in the pockets. The electronics 52 equipment is provided with an EM transceiver and the rod 42 acts to electrically connect the matrix body 30 to electronics 52.

Rotary Steerable System with a Drill Bit Assembly

To use the drill bit assembly 15 with a rotary steerable (RSS) sub 17, such as the PowerDrive™ system manufactured by Schlumberger, the drill bit assembly 15 should be as short as possible to allow for aggressive side cutting. Therefore, the electronics equipment 52 is located in the RSS sub 17 itself, and not in a separate tool sub. FIGS. 8, 9, and 10 show three different embodiments which locate the electronics equipment in different parts of a bias unit of the RSS sub 17. In each embodiment, the distance between steering pads 81 in the RSS sub 17 and the drill bit assembly 15 is unchanged. Also, a spider valve 82 in the RSS sub 17 remains unchanged. However, hydraulic lines 84 between the spider valve 82 and activating pistons (not shown) are longer to provide room for the electronics equipment 52 in the RSS sub 17. In each of these embodiments, the conductor 42 (wire or rod) electrically couples the bit head 30 to the electronics equipment 52 in the RSS sub 17.

In the embodiment shown in FIG. 8, the electronics equipment 52 is located in a mandrel cartridge 86 located in a mandrel of the RSS sub 17. The insulated rod 42 connects the electronics equipment 52 to the bit head 30. The three hydraulic lines 84 are routed in tubes between the pistons and the spider valve 82.

In the embodiment shown in FIG. 9, the electronics equipment 52 are located in sidewall pockets 88 machined into an annular body 89 of the RSS sub 17 (i.e. the drill collar). This method of mounting electronics has been extensively used in logging-while-drilling (LWD) tools known in the art. One advantage of this approach is easy access to the electronics or to replace a battery. The three hydraulic lines 84 are gun-drilled holes in the drill collar of the RSS sub 17. In addition, other sensors, such as an electrode 90, can be integrated into the drill collar. An annular pressure measurement device (not shown) could also be integrated into the drill collar of the RSS sub 17.

In the embodiment show in FIG. 10, the electronics equipment 52 are located in an annular electronics chassis 92 of the RSS sub 17. An annular chassis is used in many current LWD tools as known in the art. The hydraulic lines 84 are run through gun-drilled holed in the chassis 92. Alternatively, three tubes (not shown) could be used. The annular chassis 92 allows for external sensors to be mounted on the drill collar, and internal sensors to be mounted on the chassis 92. For example, internal and external pressure sensors 90 could be used to monitor the pressure drop across the drill bit assembly 15. Optionally, sensors (not shown) can be provided to monitor the pressures in the hydraulic lines to the pistons. This information could be used to determine if the RSS sub 17 is operating correctly.

Electromagnetic Telemetry with Drill Bit Assembly

Figure 11:
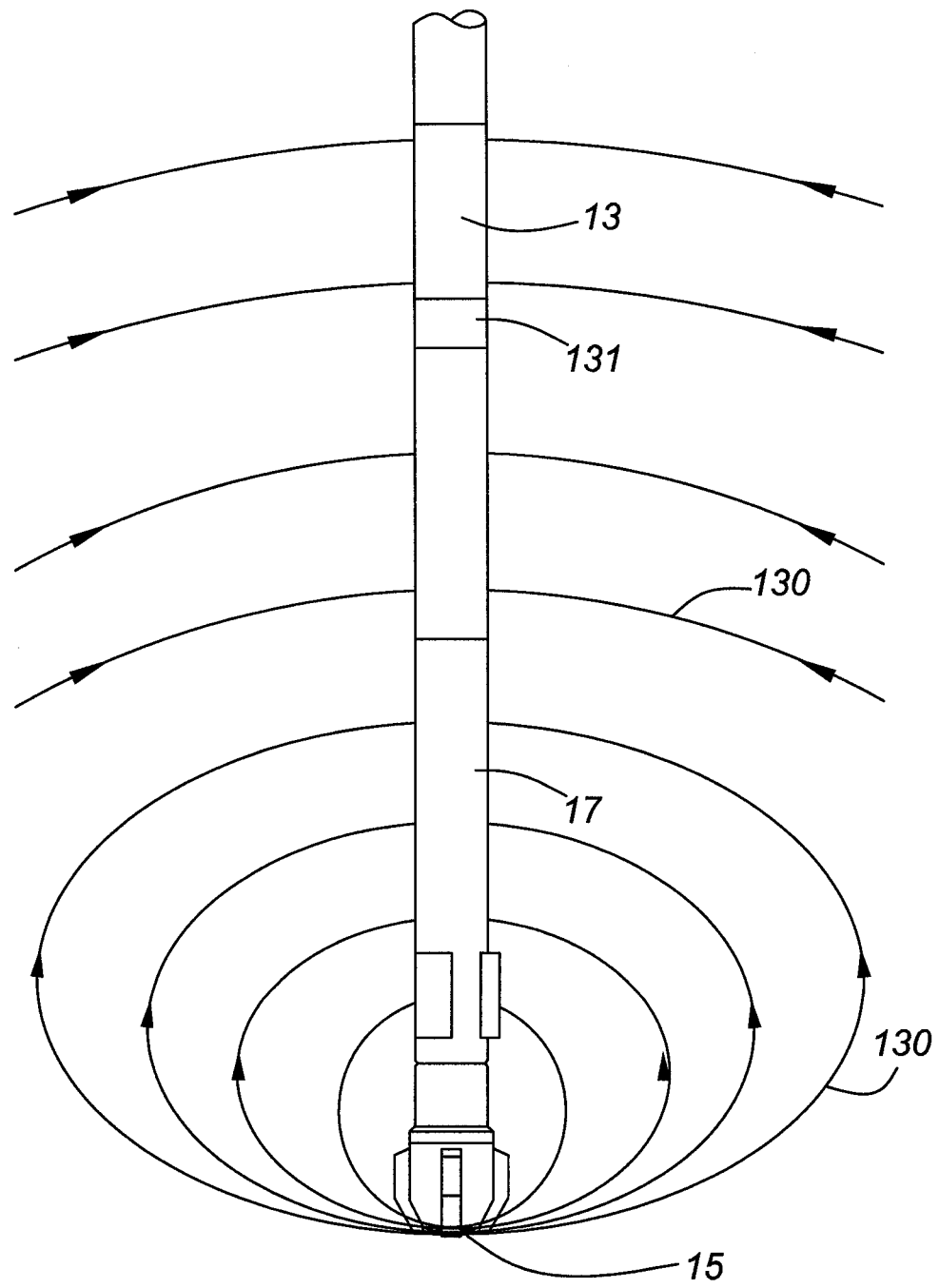
FIG. 11 is a schematic view of the drill bit assembly transmitting an EM telemetry wave to an up-hole MWD tool.

The electronics equipment 52 includes a short range electromagnetic (EM) telemetry system that transmits data between the drill bit assembly 15 and the MWD module 13 located up-string. The uplink transmission may be used to send measurements from the drill bit assembly 15 to the MWD module 13. The EM telemetry system applies an alternating voltage across the drill bit assembly 15 to produce an alternating electric current (130) in the formation, as illustrated in FIG. 11. If there is a second insulated gap 131 located in the BHA 1, e.g. in the MWD module 13, then the formation current results in a voltage drop across the MWD module's 13 insulated gap (a mud pulse telemetry tool could also be used, provided there is a sub with an insulated gap attached to it). For example, consider an uplink transmission from the drill bit assembly 15 to the MWD module 13. The basic electronics 53 for the MWD module 13 in receive mode is illustrated in FIG. 12, and the basic electronics 52 for the EM telemetry system of the drill bit assembly 15 in transmit mode is illustrated in FIG. 13.

Figure 12:
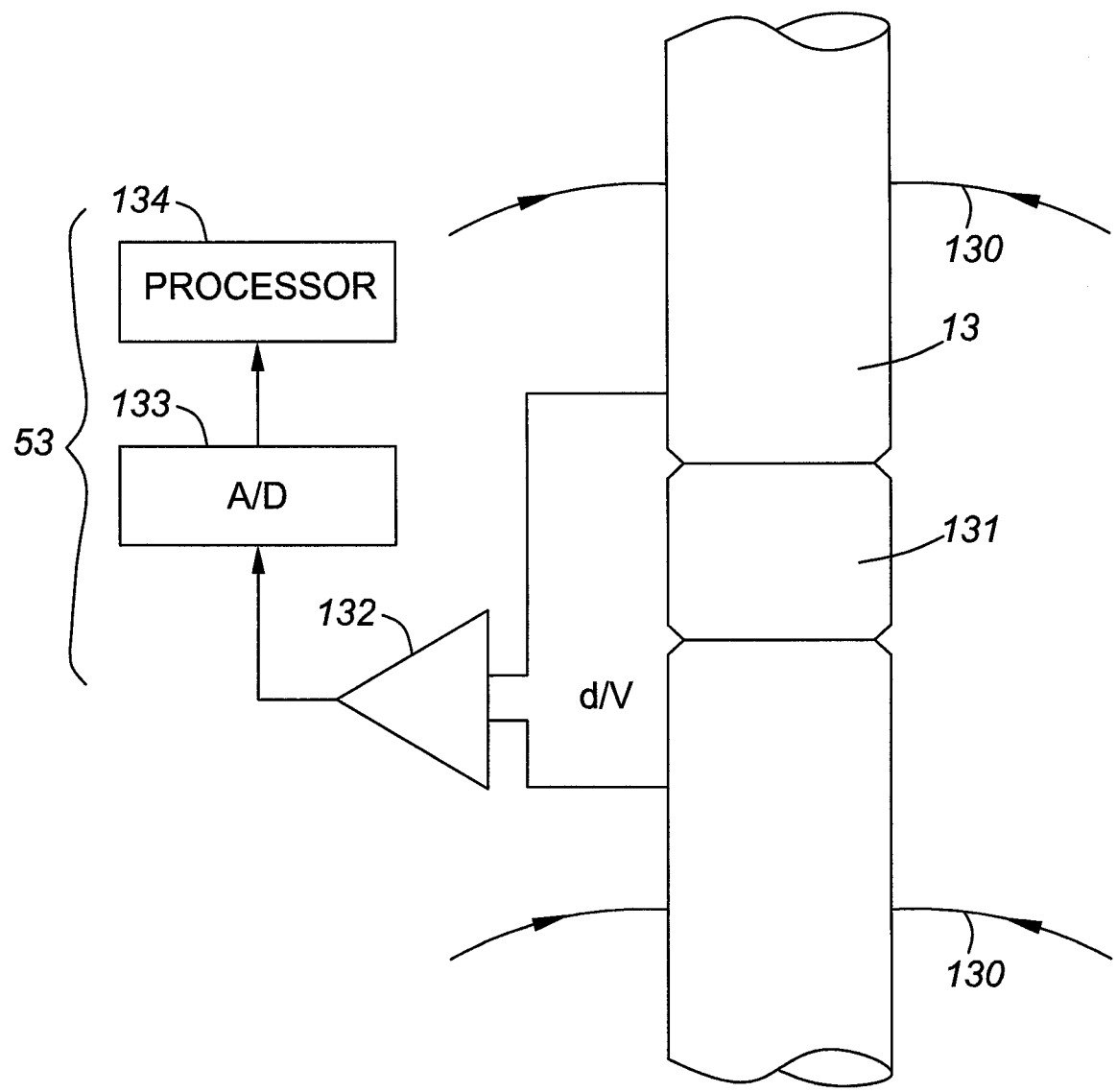
FIG. 12 is a schematic of an the MWD tool receiving the EM telemetry wave from the drill bit assembly.

Referring to FIG. 12, the electronics 53 are shown outside the drill collar for convenience in FIG. 12. In practice, electronics 53 will be located within the drill collar. The electrical current 130 in the formation results in a voltage difference dV across insulated gap 131. Differential voltage dV is fed into a high gain operational amplifier 132; the analog output of which is converted in to a digital signal via A/D 133 and fed into processor 134. Processor 134 demodulates the signal carried by electric current 130 to receive data transmitted from drill bit assembly 15. The received data may be transmitted to the surface by the MWD module 13.

Figure 13:
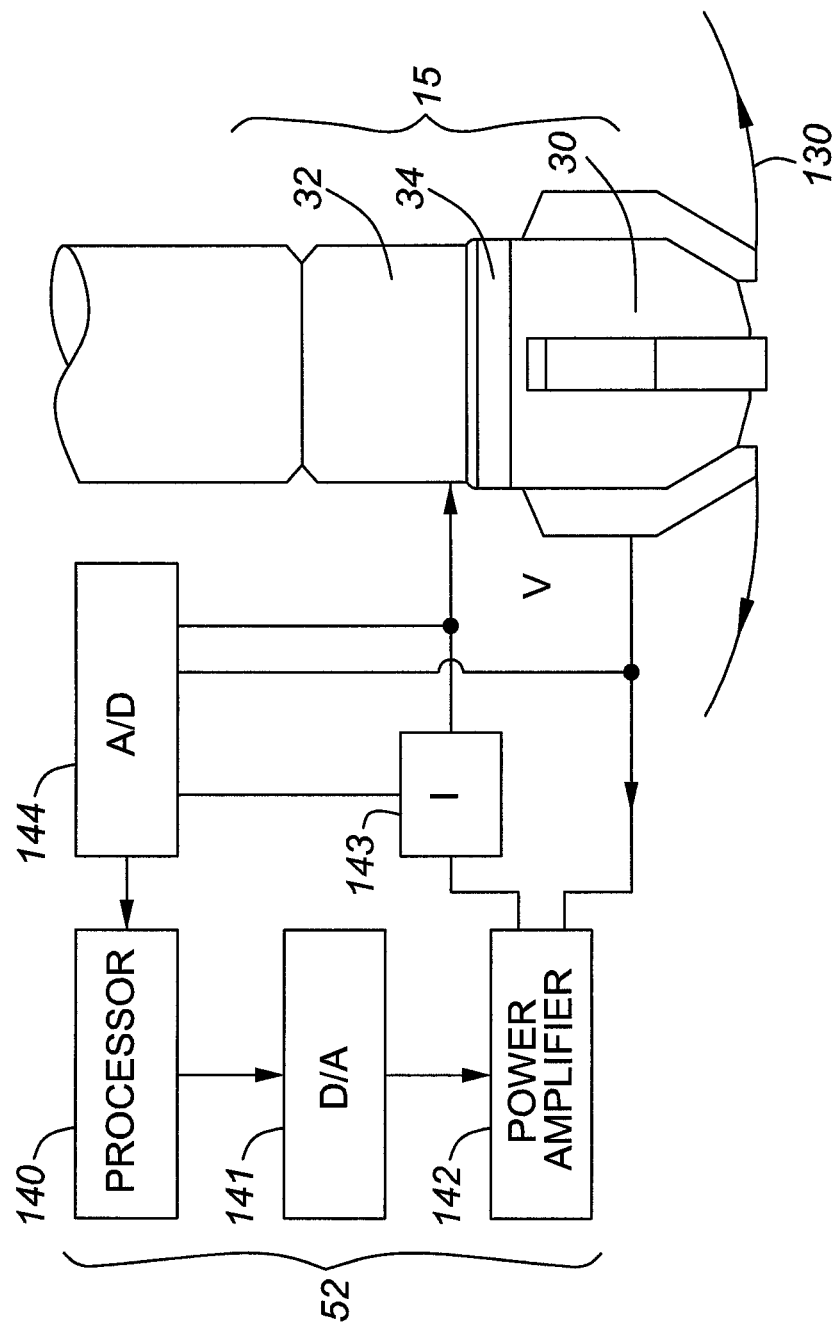
FIG. 13 is a schematic of EM telemetry transmitting electronics of the drill bit assembly.

Referring to FIG. 13, electronics 52 generates electric current 130 which flows into the formation from the matrix body 30 and double pin body 32. Electric current 130 is modulated to transmit data from drill bit assembly 15 to MWD module 13. Processor 140 sends digital data to digital to analog converter D/A 141. Analog signal from D/A 141 is amplified by power amplifier 142 and resulting voltage V is applied across insulated gap 34. Current sensor 143 measures transmitted current I, and analog to digital convertor A/D 144 may monitor the current I and voltage V. Processor 140 may then adjust the current I and voltage V for optimum transmission efficiency.

Figure 14:
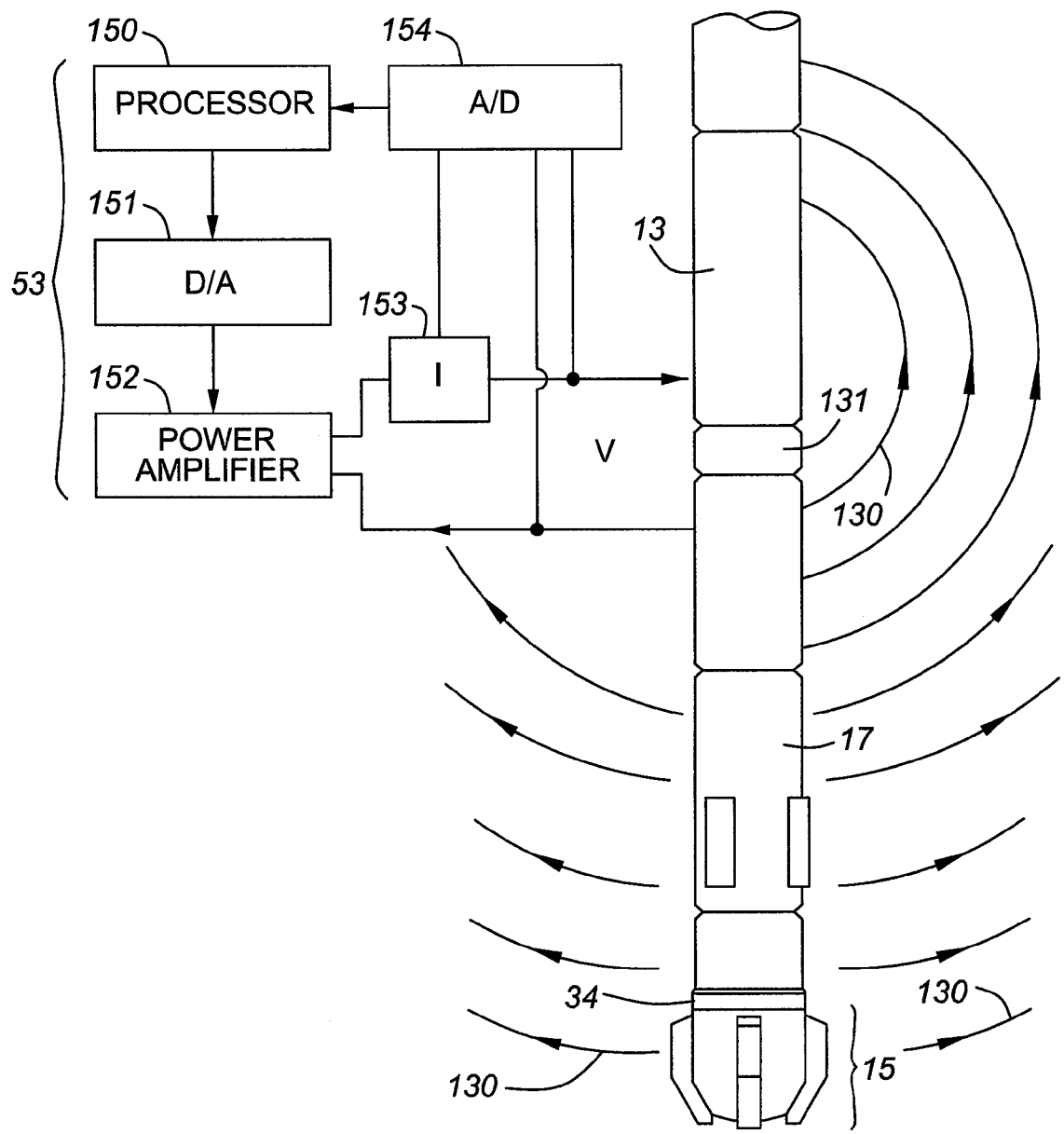
FIG. 14 is a schematic of the MWD tool transmitting an EM telemetry wave to the drill bit assembly.
Figure 15:
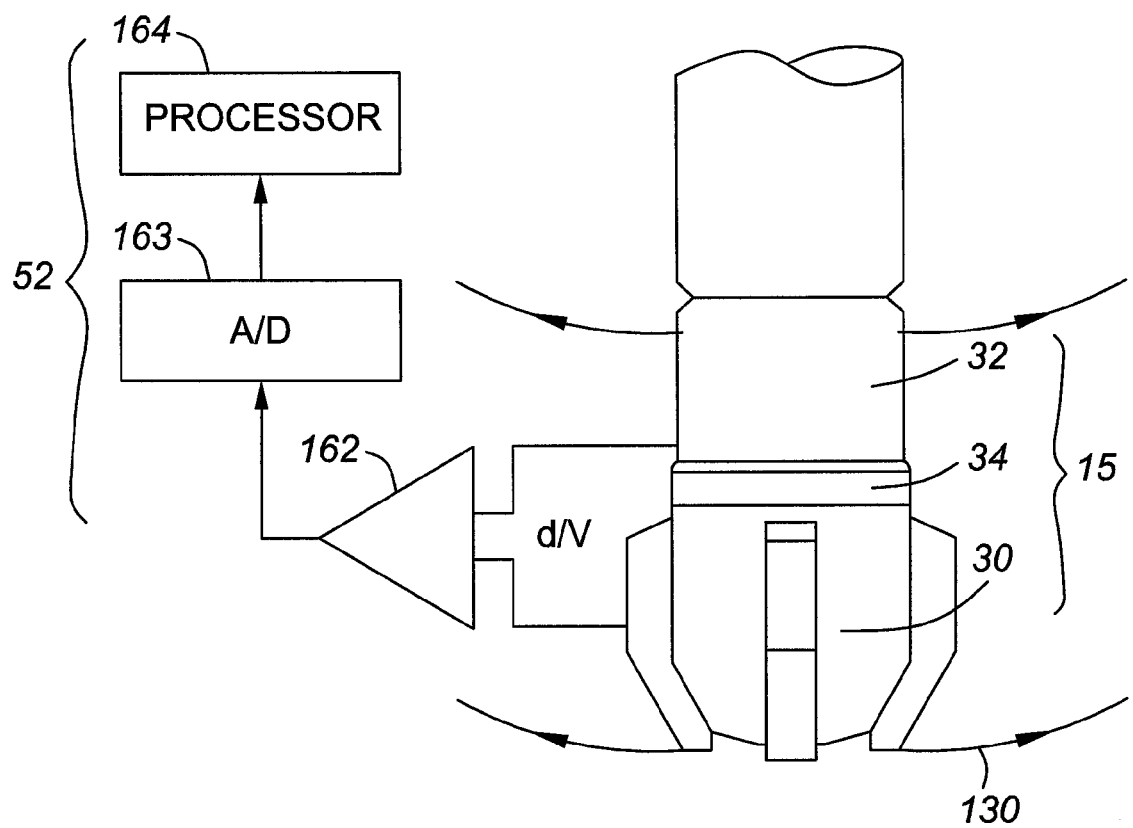
FIG. 15 is a schematic of EM telemetry receiver electronics of the drill bit assembly.

FIGS. 14 and 15 illustrate the downlink from the MWD module 13 to the drill bit assembly 15. The downlink may be used to send commands from the MWD module 13 to the drill bit assembly 15. Such commands may include requests for data from MWD module 13 to drill bit assembly 15.

Referring to FIG. 14, the electronics 53 in MWD module 13 may generate a modulated voltage V across insulated gap 131. The resulting electric current 130 produces a differential voltage dV across the insulated gap 34 of drill bit assembly 15. Processor 150 sends digital command to digital to analog converter D/A 151. Analog signal from D/A 151 is amplified by power amplifier 152 and resulting voltage V is applied across insulated gap 131. Current sensor 153 measures transmitted current I, and analog to digital convertor ND 154 may monitor the current I and voltage V. Processor 150 may then adjust the current I and voltage V for optimum transmission efficiency.

Referring to FIG. 15, the receiving electronics 52 of the drill bit assembly 15 is shown. Differential voltage dV is fed into a high gain operational amplifier 162; the analog output of which is converted in to a digital signal via ND 163 and fed into processor 164. Processor 164 demodulates the signal carried by electric current 130 to receive data transmitted from MWD module 13 to drill bit assembly 15.

Typical carrier frequencies are expected to lie between 1 Hz and a few hundred Hertz. Since the distance between the drill bit assembly 15 and the MWD module 13 will be approximately 100 feet or less, the EM telemetry system should be able operate at low power levels.

Multiplexing

Figure 16:
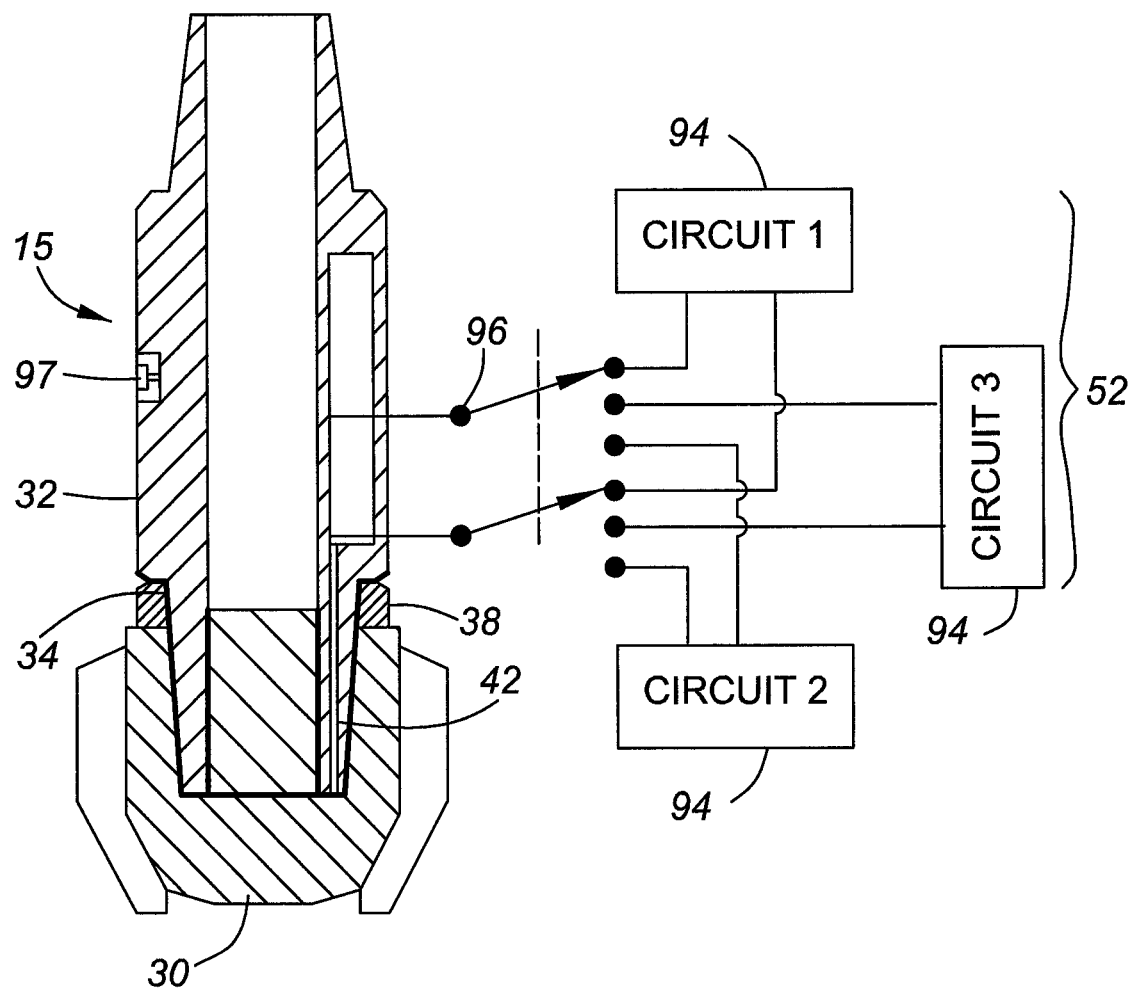
FIG. 16 is a schematic showing multiplexing different circuits in the drill bit assembly to perform certain functions.

The insulated gap joint 34 of the drill bit assembly 15 can allow many different functions. FIG. 16 illustrates how the drill bit assembly 15 can be multiplexed by switching the connection of the conductor wire 42 between different circuits 94 using a switch 96, wherein each circuit 94 performs a different function that uses the gap joint 34. For example, "Circuit 1" can be provided with EM transmitter equipment and be dedicated to transmitting data (uplink) to the MWD module 13, and Circuit "2" can be provided with EM receiver equipment and be dedicated to receiving data from the MWD module 13 (downlink) as was described above. Circuit "3" can be provided with measurement equipment and be used to conduct measurements at the drill bit assembly 15, e.g. measure the streaming potential and/or the resistivity at the drill bit assembly 15. Additional circuits (not shown) can also be provided with measurement equipment to take measurements at the drill bit assembly 15. For example, an additional circuit can be provided to measure azimuthal resistivity using one or more button electrodes 97 located in the sidewall of the drill bit assembly 15.

The MWD module 13 can act as controller for the drill bit assembly 15. The MWD module 13 can acquire and transmit standard MWD data (e.g. direction and inclination) to the surface via EM telemetry (when provided with an insulated gap joint), and receive EM downlink commands from the surface. In turn, the MWD module 13 can transmit commands to the drill bit assembly 15 and receive data from the drill bit assembly 15. For example, the MWD module 13 can command the electronics equipment 52 in the drill bit assembly 15 to change the position of the switch 96 to connect Circuit 3 to the wire 42 and operate Circuit 3 to perform a resistivity measurement. After the measurement is completed, the electronics equipment 52 operates the switch 96 to connect Circuit 1 to the wire 42 and operate Circuit 1 to transmit data to the MWD module 13, where the data may be further processed and then transmitted to the surface.

Resistivity at the Drill Bit

A resistivity measurement can be made at the drill bit assembly 15 in conductive water based mud (WBM). Referring to FIG. 14, the MWD module 13 transmits a sinusoidal current I of known amplitude and known voltage drop (V) across its insulated gap 131. A typical frequency range might be 1 Hz to 100 Hz, but higher or lower frequencies are also useable. When the drill bit assembly 15 is maintained at the same electric potential as the drill collars below the gap collar 131, the current emitted from the drill bit assembly 15 is passively focused into the formation, thus greatly minimizing borehole effects. The section of drill collars located between insulated gaps 131 and 34 acts as a long focusing electrode which forces current emitted from the matrix body 30 to return above insulated gap 131.

Figure 17:
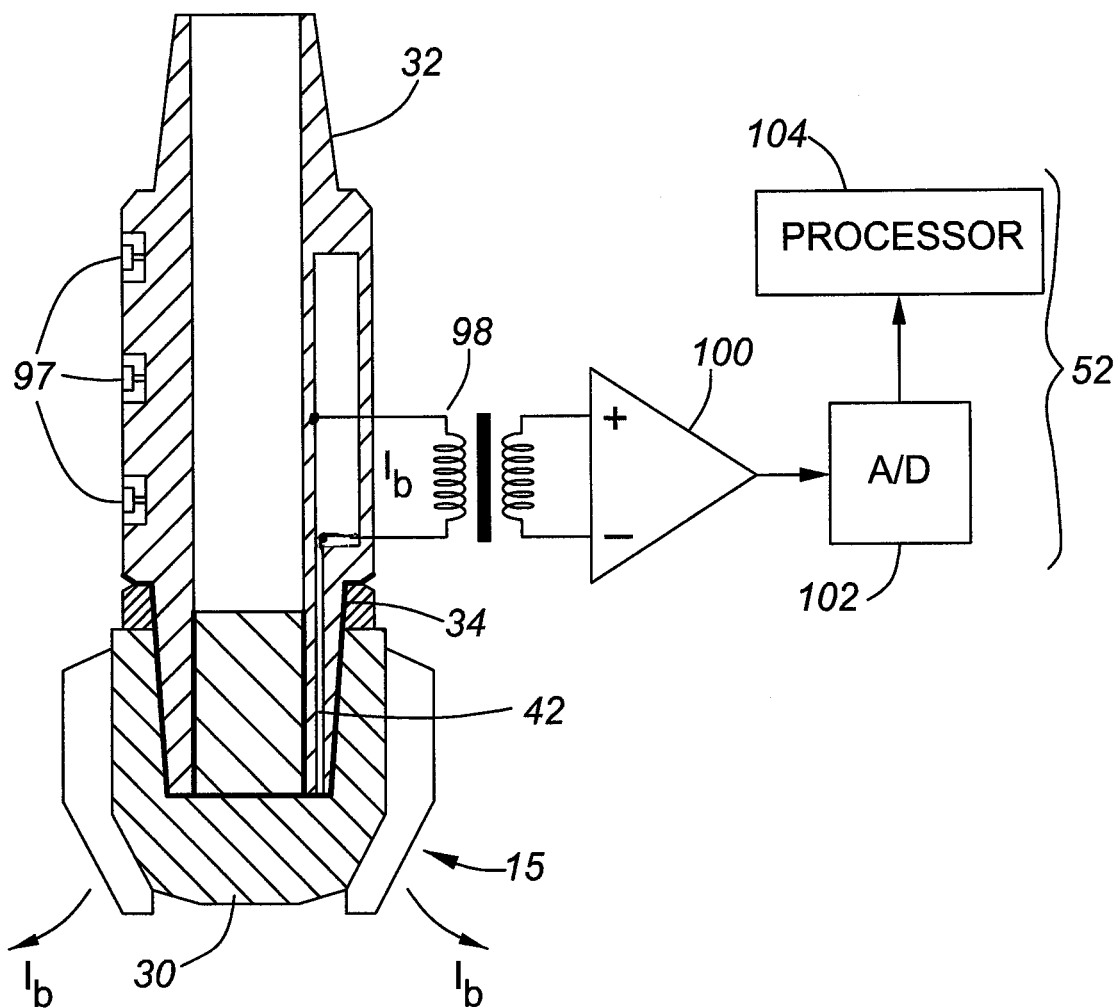
FIG. 17 is a schematic of resistivity measurement equipment of the drill bit assembly according to one embodiment.

Now referring to FIG. 17 and according to a first embodiment for measuring bit resistivity, the drill bit assembly 15 is provided with electronics equipment 52 having measurement circuitry for performing a resistivity measurement of a reservoir formation. A coil of a transformer 98 electrically couples the pin body 32 to the conductor 42; therefore, the current will conduct through this coil and the conductor 42 and into the bit head body 30 (the current will thus be referred to as "$I_{bit}$" or "$I_b$" as shown in FIG. 17). Current $I_b$ flows into the formation through the bit head 30. Transformer 98 is designed to have low impedance so that the voltage drop across the insulated gap 34 is very small compared to the voltage V across insulated gap 131. In this case, the electric potential on the matrix body 30 is the same as the potential on the double pin 32 and all of the drill collars below the insulated gap 131.

An amplifier 100 boosts the voltage on the transformer's secondary, which is then converted from analog to digital by an ND circuit 102 and fed into a processor 104. Once the drill bit current $I_b$ has been determined, it is transmitted to the MWD module 13 (for example using EM telemetry equipment in multiplexed connection to the drill bit assembly 15), where the bit resistivity is calculated from $R_b = K V/I_b$. K is a constant that is determined by the geometry of the BHA. The voltage V is measured across insulated gap 131. This provides a high resolution bit resistivity measurement.

Figure 18:
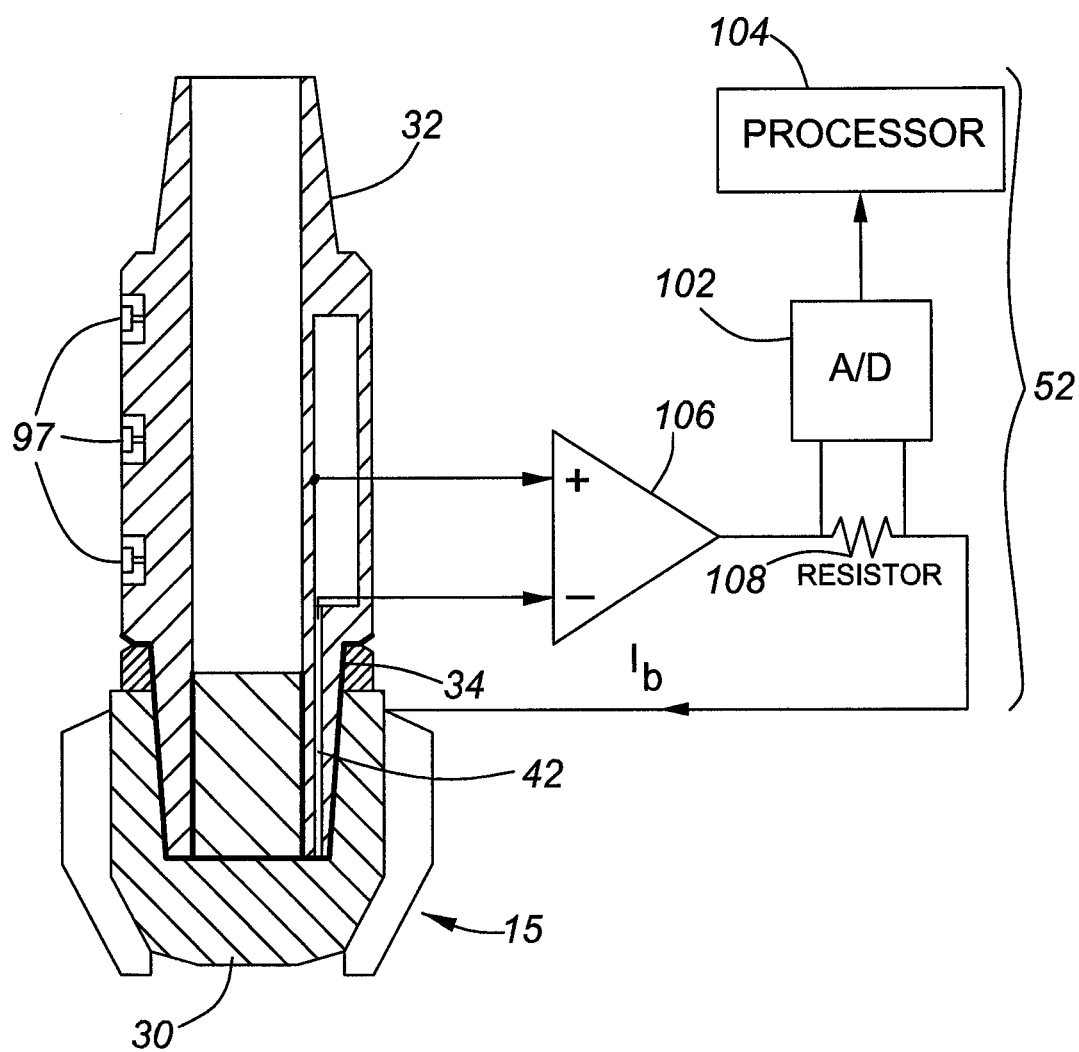
FIG. 18 is a schematic of resistivity measurement equipment of the drill bit assembly according to another embodiment.

An alternative embodiment for measuring bit resistivity is provided by a resistivity measurement circuit 52 as shown in FIG. 18. In this alternative embodiment, a high input impedance operational amplifier 106 detects the voltage drop between the bit head 30 face and the double pin body 32. The amplifier 106 drives a current ($I_b$) onto the matrix body 30 such that the voltage drop across the operational amplifier 106 is nearly zero. Correspondingly, the electric potential on the matrix body 30 is the same as the double pin body 32 and the drill collars below the insulated gap 131. The current $I_b$ produces a voltage drop across a known, precision resistor 108, which provides the current measurement $I_b$. The analog current measurement is converted into a digital signal by A/D convertor 102, which is then received by the processor 104. The processor 104 stores the $I_b$ current measurement for subsequent transmission to the MWD module 13, where the bit resistivity may be computed as before.

This second electronics implementation (FIG. 18) is well suited to low operating frequencies, but requires more battery power since the current from the drill bit assembly 15 must be provided by local battery power (power supply not shown). In the previous circuit (FIG. 17), the bit current is provided by the MWD module 13.

Figure 19:
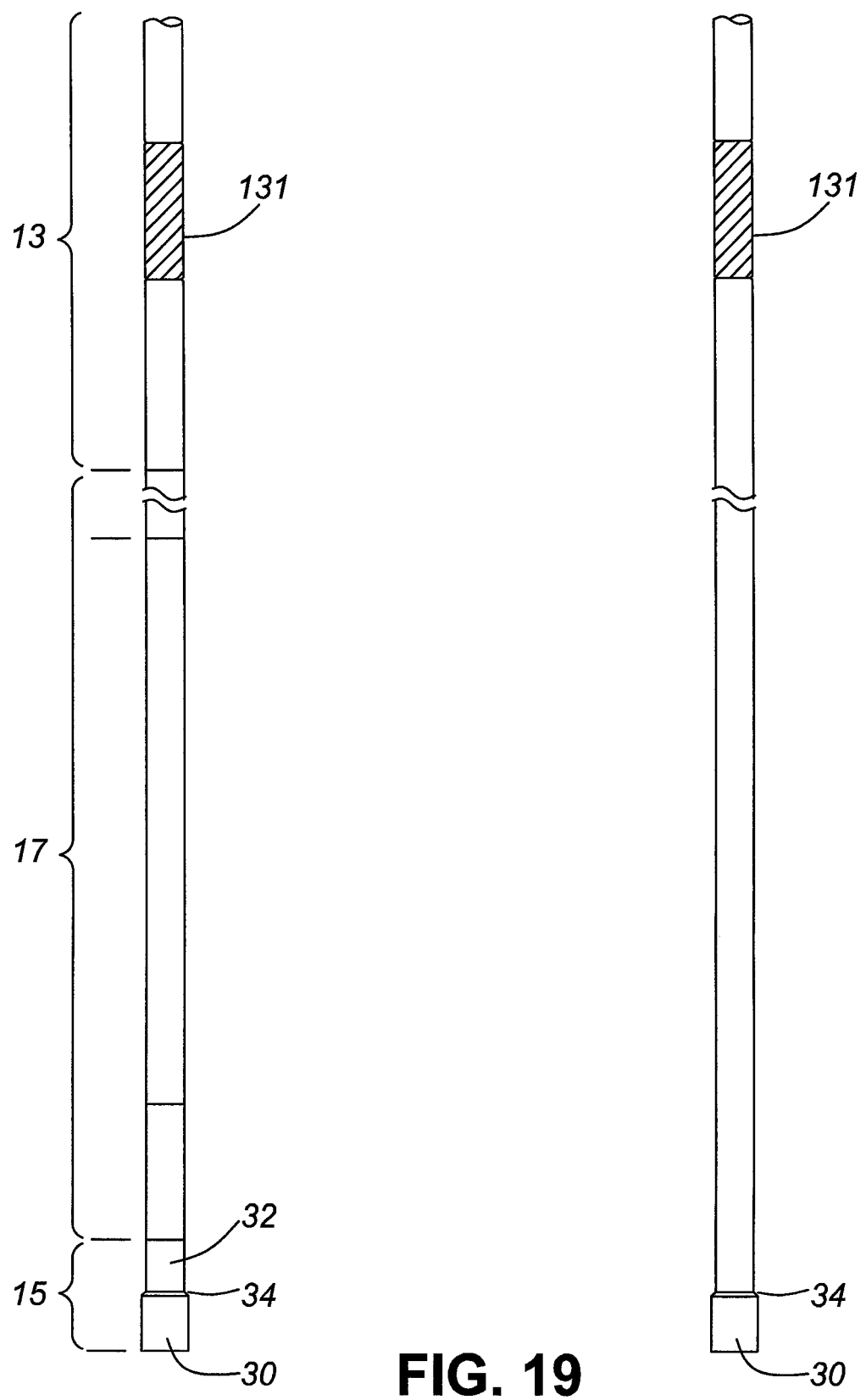
FIG. 19 is a schematic of a bottom hole assembly having the drill bit assembly.

FIGS. 19 to 24 demonstrate the bit resistivity measurement as calculated for a few illustrative geological layers. Referring to FIG. 19, a typical BHA 1 is shown which incorporates the first embodiment for measuring bit resistivity. The left hand side of this Figure shows a 6.75-inch BHA 1 consisting of an MWD module 13, a 25 ft mud motor with a PowerDrive™ (PDX5) RSS sub 17, and an 8.5-inch diameter drill bit assembly 15. The physical dimensions are appropriate for standard tools. The right hand side of FIG. 19 shows the electrical model of the BHA 1 used to compute the bit resistivity response. The face of the drill bit assembly 15 is located at 0 inches. The upper part of the MWD module 13 collar and the electrically connected drill collars above it form a $1^{st}$ electrode. It is 7 inches in diameter and extends from 548 inches to 2000 inches. The voltage on the $1^{st}$ electrode is defined as V1 and the current emitted from the electrode is defined as I1. The insulated gap 131 of the MWD module 13 is 28 inches long and 7 inches in diameter. The lower portion of the MWD module 13, the mud motor and the RSS sub 17 form the $2^{nd}$ electrode. It is 507 inches long and 7 inches in diameter. It is maintained at a voltage V2 and emits a current I2. The drill bit assembly 15 is modeled as a 12-inch long cylinder by 8.5-inch diameter electrode. There is one inch of electrical insulation between it and the $2^{nd}$ electrode provided by the gap joint 34. The drill bit electrode is maintained at a voltage V3 and emits a current I3=$I_b$. The following conditions are imposed in the theoretical calculation: V2=V3 and I1+I2+I3=0. A numerical model is used to solve for the voltages and currents for difference borehole and formation properties. The bit resistivity is calculated from $R_b = K V/I_b = K (V3-V1)/I3$.

Figure 20:
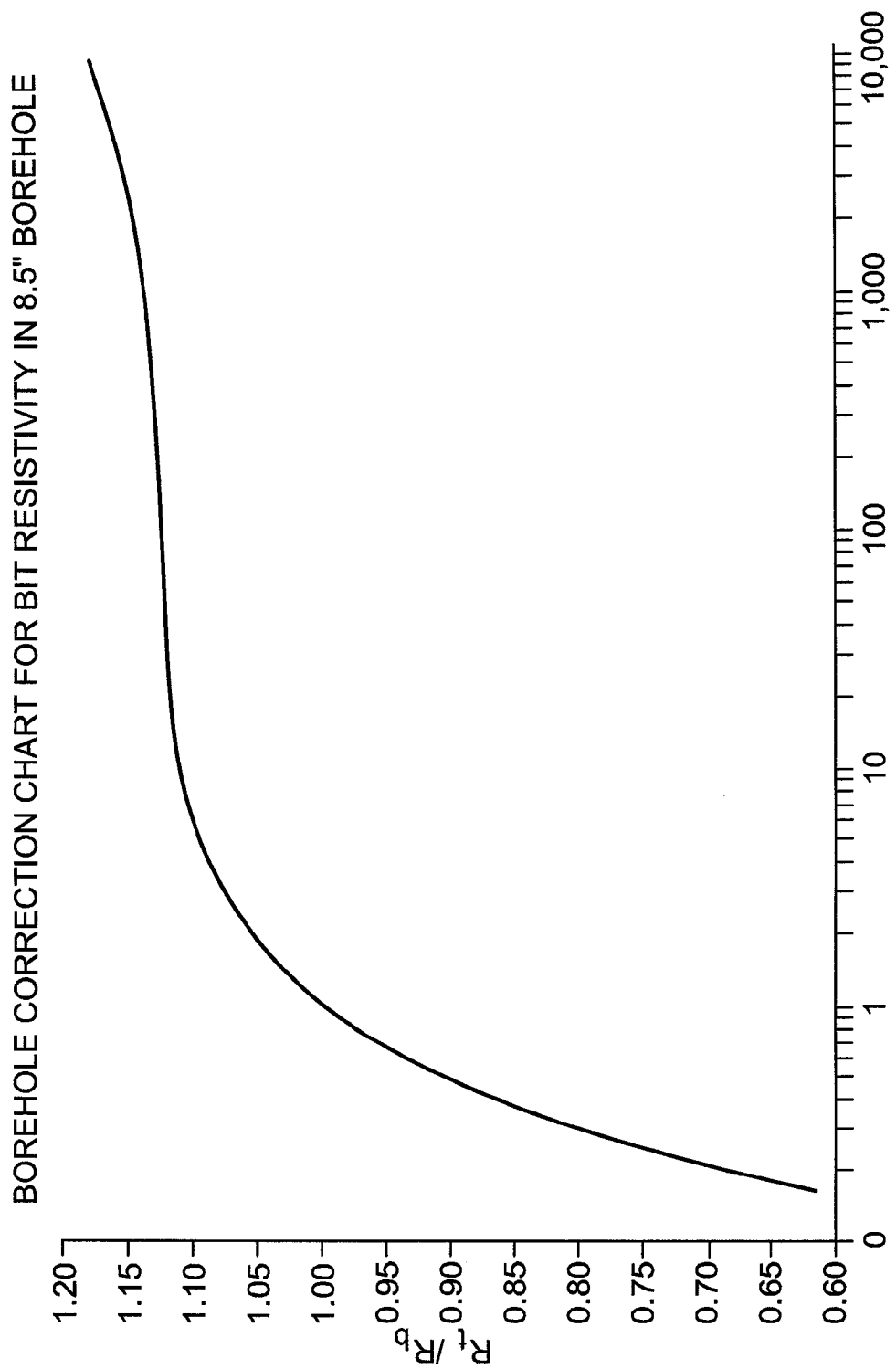
FIG. 20 is a borehole correction graph for drill bit resistivity in a 8.5" borehole.

The borehole correction chart for this BHA 1 in an 8.5-inch diameter borehole is shown in FIG. 20. This is the standard format for borehole corrections. The ratio of the bit resistivity to the mud resistivity ($R_b/R_m$) is entered on the abscissa and the correction factor is read off the ordinate. The borehole corrections are very small—due to the large distance between the drill bit assembly 15 and the insulated gap 131 of the MWD module 13. This is an excellent result as the formation resistivity is of interest, not the mud resistivity. When $1 < R_b/R_m < 8,000$, the correction factor is 18% or less.

Figure 21:
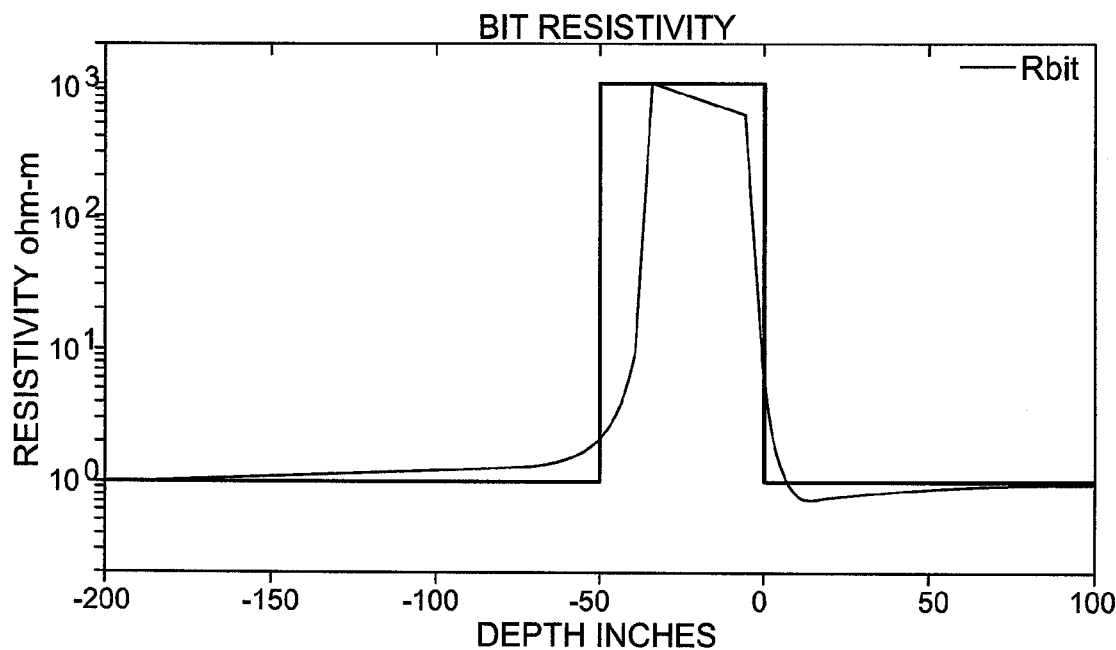
FIG. 21 is a graph of drill bit resistivity response in a 50 inch thick bed with 1000:1 contrast.
Figure 22:
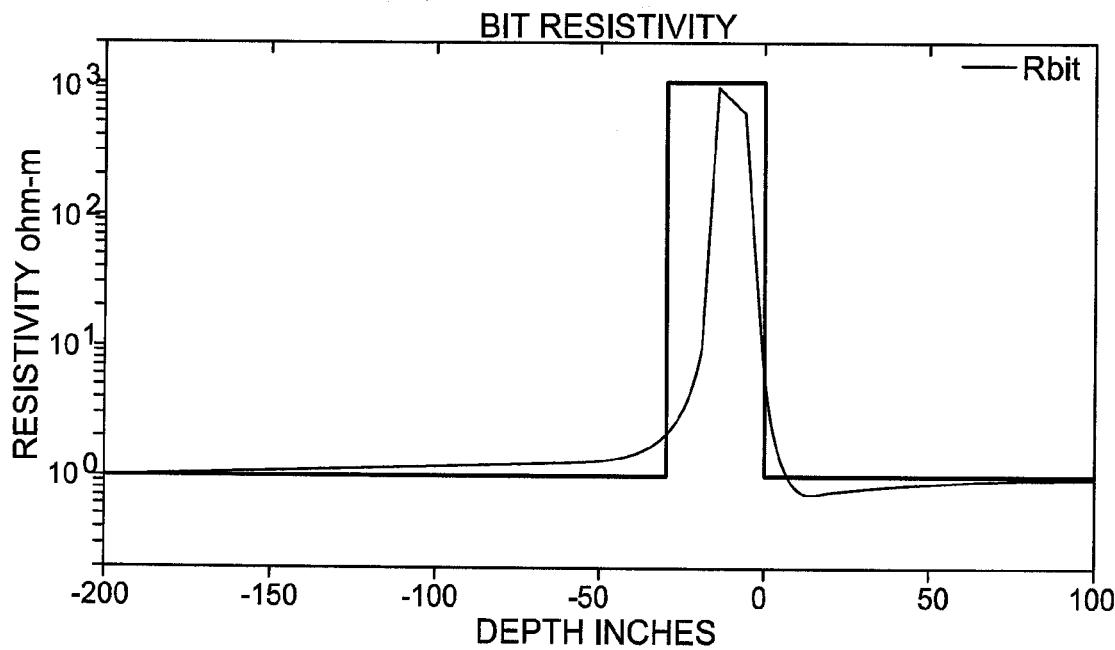
FIG. 22 is a graph of drill bit resistivity response in a 25 inch thick bed with 1000:1 contrast.
Figure 23:
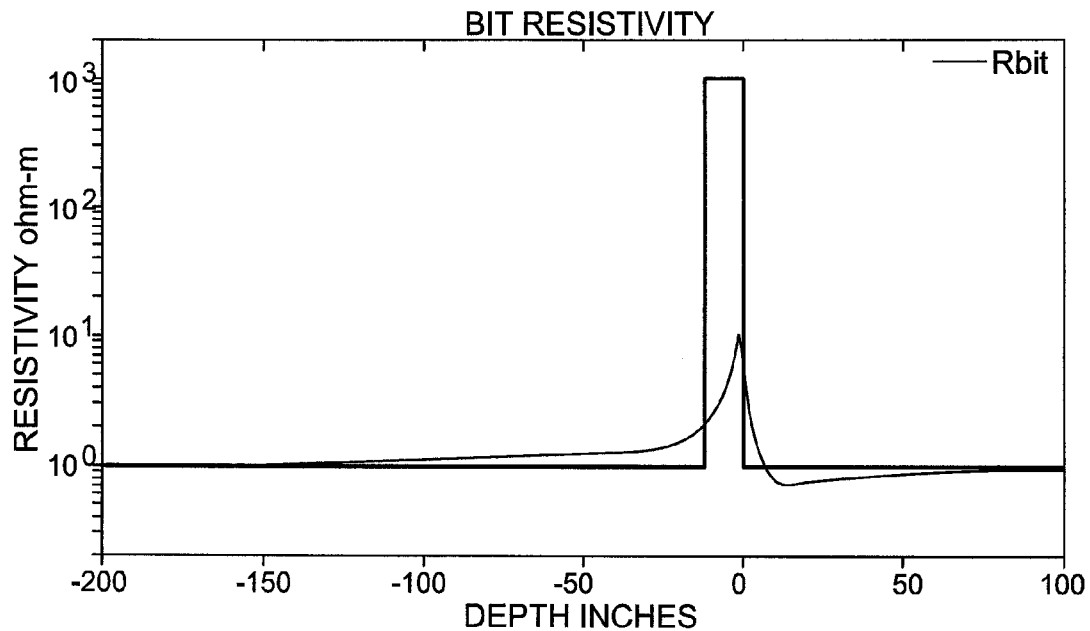
FIG. 23 is a graph of drill bit resistivity response in a 12 inch thick bed with 1000:1 contrast.
Figure 24:
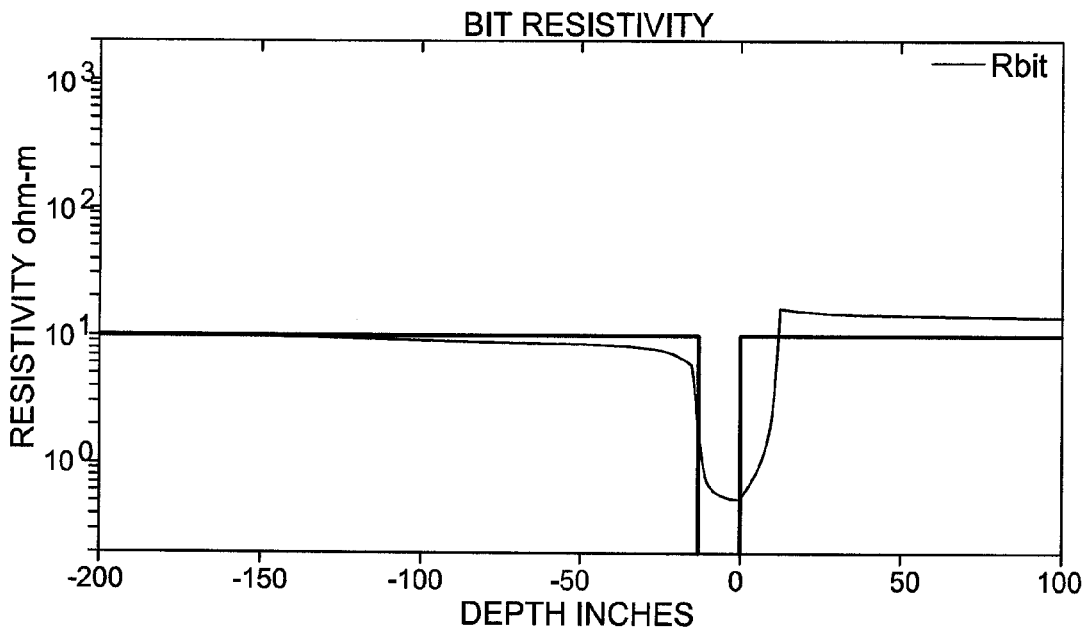
FIG. 24 is a graph of drill bit resistivity response in a 12 inch thick bed with 1:50 contrast.

The short length of the drill bit assembly 15 provides a resistivity measurement with an excellent vertical resolution. FIGS. 21, 22, and 23 illustrate the bit resistivity responses to high resistivity 50-inch, 25-inch, and 12-inch thick beds respectively. The contrast is 1000:1 between the thin bed resistivity and the shoulder bed resistivity. The bit resistivity is able to read the full resistivity value in the center of the 50-inch and 25-inch thick beds. The bit resistivity clearly detects the high resistivity 12-inch bed, but cannot read the true resistivity. FIG. 24 shows the bit resistivity in a 12-inch 0.2 ohm-m bed with 10 ohm-m shoulders for a 1:50 contrast. The bit resistivity response is asymmetric since no electrode is below the drill bit.

In addition to the bit resistivity, azimuthal resistivity measurements can be made with the button electrodes 97 located in the sidewall of the drill bit assembly (see FIGS. 16 to 18). This is similar to the borehole imaging technology provided by RAB™ tools, which can detect 1-inch thick beds. The electronics for the button electrodes 97 can be similar to those for measuring bit resistivity. For borehole imagining, this design is sufficient.

For robustness, the sidewall button electrodes 97 can be slightly recessed below the surface. An alternate more aggressive design is to place a button electrodes 97 in the cutting face of the drill bit assembly 15.

Streaming Potential at the Bit

The streaming potential is a voltage that occurs when fluids flow in a porous rock formation, such as in sandstone or carbonate rocks. In reservoir rocks there exists a thin charged double layer at the interface between the porous rock formation and water in the porous rock formation. In typical conditions, the matrix surface is negatively charged, and the water is positively charged. When water moves under a pressure gradient, an electrical current is created with the water current. The electrical current is proportional to the water current, which is proportional to the pressure gradient. The streaming potential has transients that are associated with pressure transients in the formation, which can be measured to determine reservoir properties such as permeability, reservoir size. The basic physics of streaming potential is described in detail in U.S. Pat. No. 7,388,380 and U.S. Pat. No. 7,301,345 which is herein incorporated by reference.

Figure 25:
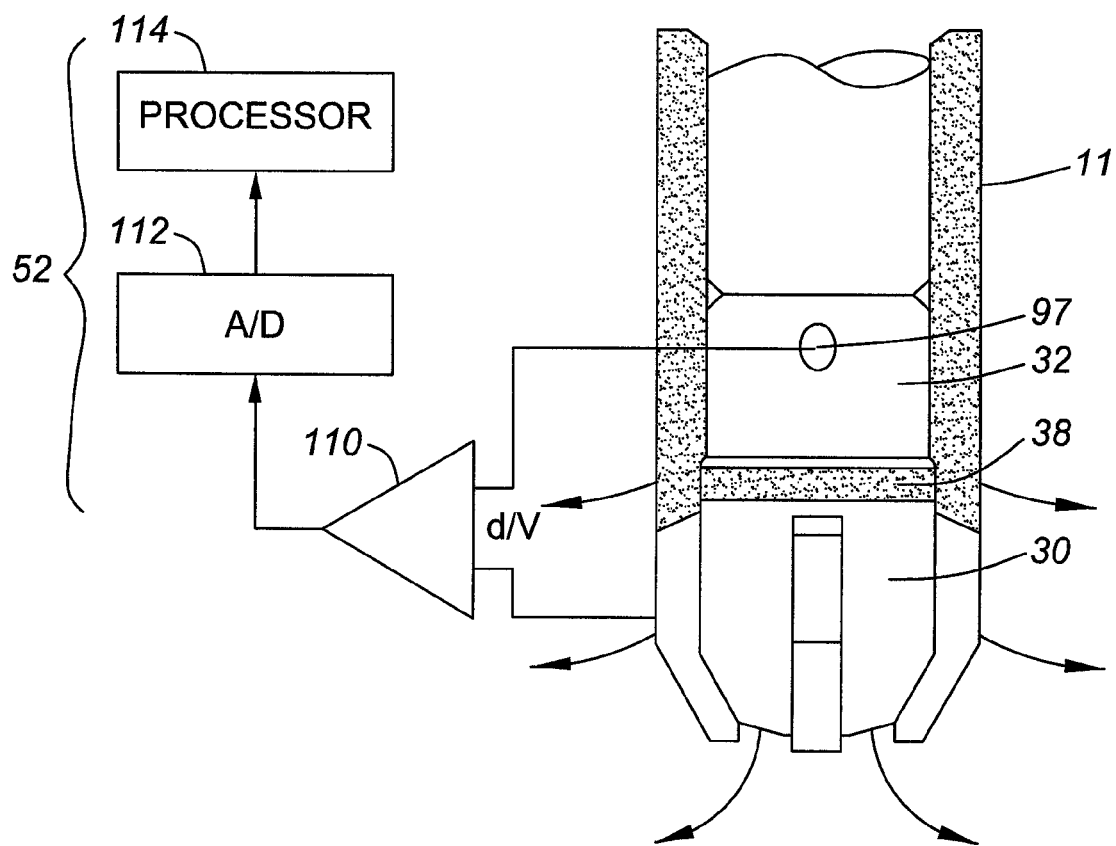
FIG. 25 is a schematic of streaming potential measurement equipment of the drill bit assembly.

In this embodiment, the drill bit assembly 15 can be provided with measurement circuitry adapted to measure streaming potential as is shown in FIG. 25. During a time interval when the MWD module 13 is not transmitting, the streaming potential may be measured. Referring to FIG. 16, the appropriate circuit would be selected for the streaming potential measurement. The insulated gap 34 allows a voltage to develop between the bit head 30 of the drill bit assembly 15 and the pin body 32 and electrically connected drill collars above the insulated gap joint 34. The bit head 30 serves as one electrode, and the double pin body 32 and the other drill collars serve as the second electrode. Alternatively, the upper electrode can be a stable electrode, such as a silver-chloride electrode. Without the gap joint 34, the large conductive BHA 1 shorts out the streaming potential voltage near the drill bit assembly 15. The streaming potential can be measured between the bit head 32 and an electrode 97 located above the insulated gap joint 34 and amplified by amplifier 110; the resulting analog signal is converted into a digital signal by A/D convertor 112, which is then fed to a processor 114. The processor 114 has a memory with instructions for execution by the processor 114 to determine the streaming potential from the measured voltage difference (dV); and this information can conveyed up-string by EM telemetry equipment (not shown) in multiplexed connection to the drill bit assembly 15.

The streaming potential is proportional to the pressure drop between the borehole and the formation, and therefore responds to changes in the formation pressure. The streaming potential can potentially detect kicks (influx of fluids into the borehole), detect lost circulation and fractures, and determine formation pressure trends. The streaming potential is also related to the lithology, formation resistivity, and other factors. Thus, it is important to measure resistivity and streaming potential at the drill bit assembly 15.

Other Measurements at the Drill Bit Assembly

The telemetry function of the drill bit assembly 15 can be used to transmit other data and receive commands from the surface via the MWD module 13 downlink capability. Other measurements that might be made include: inclination at the bit, bit temperature, bit vibration, bit RPM (e.g. from accelerometers or magnetometers), and gamma-ray. Inclination at the bit is useful for both rotary steerable systems and mud motors with bent subs. Bit temperature, vibration, and RPM measurements can be used to determine if the drill bit assembly 15 is worn, if the drill bit assembly 15 is chattering, or if stick-slip conditions are occurring. In the case of mud motors with bent subs, the bit RPM measurement can be used to monitor the performance of the mud motor 17.

If the drill bit assembly 15 is integrated with a RSS sub 17, as illustrated in FIG. 8, 9, or 10, then the drill bit assembly 15 can be used to communicate between the MWD module 13 and the RSS sub 17. This would allow very fast downlink commands to the RSS sub 17 while providing the capability to transmit RSS sub 17 diagnostics to the surface.

Electromagnetic Telemetry With Rotary Steerable System

Figure 26:
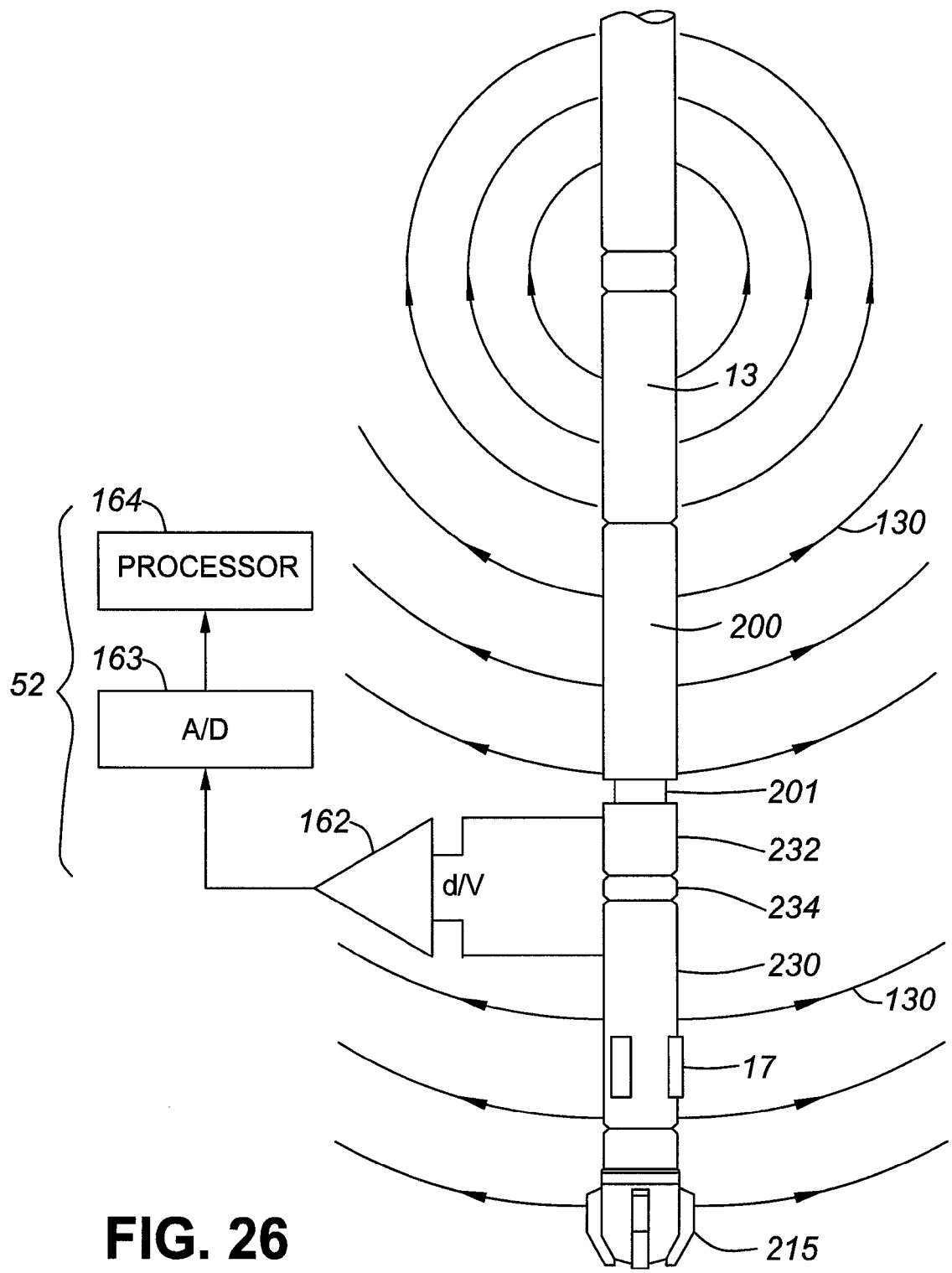
FIG. 26 is a schematic view of bottom hole assembly having a RSS sub with an insulated gap joint transmitting an EM telemetry wave to the MWD tool.

Referring to FIG. 26 and according to another embodiment, a drill bit assembly 215 is connected to rotary steerable (RSS) sub 17, such as the PowerDrive™ system manufactured by Schlumberger, which may be modified to include an insulated gap section 234 in the RSS drill collar. The RSS sub 17 may be run below mud motor 200 which rotates the RSS sub 17. The mud motor 200 has a rotating shaft 201 which attaches to RSS sub 17. Thus a direct electrical connection between the MWD module 13 and RSS 17 may be difficult to achieve such that there is no direct wire path between RSS 17 and MWD module 13. To provide communication between MWD module 13 and RSS 17, the electromagnetic telemetry system previously described for the drill bit assembly 15 may be adapted. To receive a directional drilling command from the MWD module 13, RSS 17 may measure the voltage dV generated across insulated gap 234 using electronics 52. The differential voltage results from modulated current 130 produced by MWD module 13. Differential voltage dV is fed into a high gain operational amplifier 162; the analog output of which is converted in to a digital signal via ND 163 and fed into processor 164. Processor 164 demodulates the signal carried by electric current 130 to receive data transmitted from MWD module 13. To transmit data from RSS 17 to MWD module 13, transmission electronics 53 similar to that shown for the drill bit assembly may be employed.

Communication may be established between any two down subs in the BHA provided each has an insulated gap with the associated electronics described herein.

While the present invention has been described herein by the preferred embodiments, it will be understood by those skilled in the art that various consistent and now obvious changes may be made and added to the invention. The changes and alternatives are considered within the spirit and scope of the present invention.

What is claimed is:

1. A drill bit assembly for measuring reservoir formation properties, comprising
    an electrically conductive bit head having a cutting end and an opposite connecting end with an engagement section;
    an electrically conductive pin body comprising a connecting end with an engagement section, the pin body connecting end positioned relative to the bit head connecting end such that the engagement sections overlap with a gap therebetween;

an electrically insulating gap joint filling the gap between the bit head and pin body engagement sections such that the bit head and pin body are mechanically connected together at the connecting ends but electrically separated;

an electrical conductor electrically connected at a first end to the bit head and communicable at a second end with an alternating current signal to transmit an alternating current into the bit head, thereby inducing an electric current into a reservoir formation adjacent the bit head, and electronic equipment including measurement circuitry configured to determine the alternating current at the bit head, the alternating current being inversely proportional to a bit resistivity of the formation, wherein the electronic equipment further includes a switch electrically coupled to the conductor and switchable between EM telemetry circuitry wherein the bit head serves as an EM telemetry antenna, and the measurement circuitry wherein the bit head serves as an electrode for measuring formation properties.

2. A drill bit assembly is claimed in claim 1 wherein the electrical conductor second end is electrically coupled to the pin body, and the pin body is electrical coupled to an electrically conductive lower drill collar of a MWD module having an electrically insulating gap and configured to emit the alternating current signal in the form of an electromagnetic wave across the MWD module insulating gap, thereby inducing the alternating current in the drill collar.

3. A drill bit assembly as claimed in claim 2 wherein the measurement circuitry comprises a transformer with a first coil and a second coil electrically coupling the conductor to the pin body, an amplifier electrically coupled to the first coil, and analog/digital (A/D) converter electrically coupled to the amplifier for receiving an amplified analog signal representing the alternating current and converting the signal to a digital signal, and a processor electrically coupled to the A/D converter to receive and process the digital signal.

4. A drill bit assembly as claimed in claim 3 wherein the electromagnetic (EM) telemetry circuitry is in communication with the processor and configured to transmit data received from the processor as an EM telemetry signal into the formation.

5. A bottomhole assembly comprising the drill bit assembly as claimed in claim 2 wherein the MWD module includes EM telemetry equipment to receive the EM telemetry signal from the drill bit assembly including the determined alternating current, and a processor having a memory with instructions for execution by the processor to calculate a bit resistivity from the determined alternating current, and from a measured voltage drop across the bit head and a drill collar above the MWD module electrically insulating gap.

6. A drill bit assembly as claimed in claim 1 wherein the measurement circuitry comprises a high input impedance operational amplifier having inputs electrically coupled to the pin body and the bit head, and a resistor of known resistance electrically coupled to the amplifier and to the second end of the electrical conductor, and wherein an alternating current signal source is coupled to the amplifier such that the alternating current at the bit head is determined from a voltage drop measured across the resistor.

7. A drill bit assembly as claimed in claim 6 wherein the measurement circuitry further comprises a processor having a memory with instructions for execution by the processor to calculate a bit resistivity from the determined alternating current, and from a measured voltage drop across insulating gap joint.

8. A drill bit assembly as claimed in claim 7 wherein the electronic equipment further comprises electromagnetic telemetry (EM) circuitry in communication with the processor and configured to transmit data received from the processor as an EM telemetry signal into the formation.

9. A drill bit assembly as claimed in claim 1 further comprising azimuthal resistivity electrodes and the electronics equipment include measurement circuitry in communication with the azimuthal resistivity electrodes and configured to determine azimuthal resistivity of the formation from an alternating current measured at the azimuthal resistivity electrodes.

10. A drill bit assembly as claimed in claim 9 wherein the azimuthal resistivity electrodes are button electrodes located in at least one of a sidewall of the pin body, and in a cutting face of the bit head.

11. A drill bit assembly as claimed in claim 1 further comprising a streaming potential electrode on the pin body, and the electronics equipment includes measurement circuitry in electrical communication with the streaming potential electrode and the bit head and configured to measure the voltage difference therebetween and having a processor with a memory having instructions for execution by the processor to determine the streaming potential of a fluid in contact with the drill bit assembly from the measured voltage difference.

12. A drill bit assembly for measuring reservoir formation properties, comprising
    an electrically conductive bit head having a cutting end and an opposite connecting end with an engagement section;
    an electrically conductive pin body comprising a connecting end with an engagement section and a streaming potential electrode on a surface of the pin body, the pin body connecting end positioned relative to the bit head connecting end such that the engagement sections overlap with a gap therebetween;
    an electrically insulating gap joint filling the gap between the bit head and pin body engagement sections such that the bit head and pin body are mechanically connected together at the connecting ends but electrically separated;
    electronic equipment including measurement circuitry in electrical communication with the streaming potential electrode and the bit head and configured to measure the voltage difference therebetween and having a processor with a memory having instructions for execution by the processor to determine the streaming potential of a fluid in contact with the drill bit assembly from the measured voltage difference, wherein the electronic equipment is switchable between EM telemetry circuitry wherein the bit head serves as an EM telemetry antenna, and the measurement circuitry wherein the bit head serves as an electrode for measuring formation properties.

13. A method for measuring reservoir formation properties by a drill bit assembly comprising
    transmitting an alternating current from an alternating current signal to a bit head of a drill bit assembly thereby inducing an electromagnetic wave into a reservoir formation adjacent the bit head, the bit head being mechanically connected to but electrically separated from the rest of the drill bit assembly by an electrically insulating gap joint;
    determining the alternating current at the bit head, the alternating current being proportional to a bit resistivity of the formation; and
    using electronic equipment to switch between EM telemetry circuitry wherein the bit head serves as an EM telemetry antenna, and measurement circuitry wherein the bit head serves as an electrode for measuring formation properties.

14. A method as claimed in claim 13 wherein the drill bit assembly comprises the bit head and a pin body and the gap joint mechanically connects but electrically separates the bit head from the pin body.

15. A method as claimed in claim 14 wherein the alternating current signal is an electromagnetic wave generated by a MWD module having an electrically insulating gap joint, and wherein the electromagnetic wave crosses the MWD module gap joint and into an electrically conductive lower drill collar of the MWD module to induce the alternating current which conducts from the lower drill collar to the pin body which is electrically coupled to the lower drill collar and to a conductor which crosses the drill bit assembly gap joint to contact the bit head.

16. A method as claimed in claim 15 further comprising transmitting an electromagnetic telemetry signal including the determined alternating current from the drill bit assembly to the MWD module and determining at the MWD module the bit resistivity from the determined alternating current, and a voltage drop across the MWD module insulating gap.

17. A method as claimed in claim 14 further comprising determining azimuthal resistivity of the formation by measuring an alternating current at an azimuthal resistivity electrode on the drill bit assembly.

18. A method as claimed in claim 14 further comprising determining a streaming potential of the formation by measuring a voltage difference between a streaming potential electrode on the surface the pin body and the bit head.

19. A drill bit assembly for measuring reservoir formation properties, comprising
an electrically conductive bit head having a cutting end and an opposite connecting end with an engagement section;
an electrically conductive pin body comprising a connecting end, the pin body connected to the bit head at their respective connecting ends;
at least one of the bit head and the pin body comprising two mating pieces each with a mating end positioned relative to each other such that a gap is formed therebetween;
an electrically insulating gap joint filling the gap between the two pieces of the bit head or pin body or both such that the two mating pieces are mechanically connected together at the mating ends but electrically separated;
an electrical conductor extending across the gap joint and electrically coupled at a first end of the bit head and communicable at a second end with an alternating current signal to transmit an alternating current into the bit head, thereby inducing an electric current into a reservoir formation adjacent the bit head, and
electronic equipment including measurement circuitry configured to determine the alternating current at the bit head, the alternating current being inversely proportional to a bit resistivity of the formation, wherein the electronic equipment is switchable between EM telemetry circuitry wherein the bit head serves as an EM telemetry antenna, and the measurement circuitry wherein the bit head serves as an electrode for measuring formation properties.

20. A drill bit assembly for measuring reservoir formation properties, comprising
an electrically conductive bit head having a cutting end and an opposite connecting end;
an electrically conductive pin body comprising a connecting end and a streaming potential electrode on a surface of the pin body, the pin body connected to the bit head at their respective connecting ends;
at least one of the bit head and the pin body comprising two mating pieces each with a mating end positioned relative to each other such that a gap is formed therebetween,
an electrically insulating gap joint filling the gap between the two pieces of the bit head or pin body or both such that the two mating pieces are mechanically connected together at the mating ends but electrically separated, and wherein the gap joint also electrically separates the streaming potential electrode from at least part of the bit head;
electronic equipment including measurement circuitry in electrical communication with the streaming potential electrode and the at least part of the bit head that is electrically separated from the streaming potential electrode, the measurement circuitry configured to measure the voltage difference therebetween and having a processor with a memory having instructions for execution by the processor to determine the streaming potential of a fluid in contact with the drill bit assembly from the measured voltage difference, wherein the electronic equipment is switchable between EM telemetry circuitry wherein the bit head serves as an EM telemetry antenna, and the measurement circuitry wherein the bit head serves as an electrode for measuring formation properties.

* * * * *